United States Patent
Hayashi et al.

(10) Patent No.: US 11,543,500 B2
(45) Date of Patent: Jan. 3, 2023

(54) INFORMATION PROCESSING DEVICE, OPTICAL APPARATUS, CONTROL METHOD, PROGRAM AND STORAGE MEDIUM

(71) Applicant: PIONEER CORPORATION, Tokyo (JP)

(72) Inventors: Yukio Hayashi, Kawagoe (JP); Yoshinori Abe, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 1029 days.

(21) Appl. No.: 16/317,443

(22) PCT Filed: Jul. 12, 2016

(86) PCT No.: PCT/JP2016/070533
§ 371 (c)(1),
(2) Date: Jan. 11, 2019

(87) PCT Pub. No.: WO2018/011878
PCT Pub. Date: Jan. 18, 2018

(65) Prior Publication Data
US 2019/0250250 A1    Aug. 15, 2019

(51) Int. Cl.
*G01S 7/487*    (2006.01)
*G01S 7/48*    (2006.01)
(Continued)

(52) U.S. Cl.
CPC ............ *G01S 7/487* (2013.01); *G01S 7/4808* (2013.01); *G01S 7/4817* (2013.01); *G01S 7/497* (2013.01)

(58) Field of Classification Search
CPC .... G01S 7/4808; G01S 7/4813; G01S 7/4817; G01S 7/4876; G01S 7/497; G01S 17/18
(Continued)

(56) References Cited

U.S. PATENT DOCUMENTS 5,991,011 A    11/1999    Damm
5,995,233 A *  11/1999    Ohtomo .............. G01C 15/006
                                             356/400
(Continued)

FOREIGN PATENT DOCUMENTS

JP    57-136180 A    8/1982
JP    S62-086569 U    6/1987
(Continued)

OTHER PUBLICATIONS

European Search Report for related EP App. No. 16908782.2 dated Jan. 8, 2020; 7 pages.
(Continued)

*Primary Examiner* — John H Le
(74) *Attorney, Agent, or Firm* — Procopio, Cory, Hargreaves & Savitch LLP

(57) ABSTRACT

A LIDAR 1 includes: a scanner 55 that emits outgoing light Lo while changing the outgoing direction thereof; a reflection member 8 that is arranged in a first outgoing direction and reflects the outgoing light Lo; an absorption member 7 that is arranged in a second outgoing direction and absorbs the outgoing light Lo; an APD 41 that receives return light Lr; and a DSP16. The DSP 16 generates replica u representing a component reflected by the absorption member 7 on the basis of output signals of the APD 41 obtained at each time when the outgoing light Lo is emitted in the first outgoing direction and in the second outgoing direction.

7 Claims, 18 Drawing Sheets

(51) Int. Cl.
    *G01S 7/481* (2006.01)
    *G01S 7/497* (2006.01)
(58) Field of Classification Search
    USPC .......................................................... 702/159
    See application file for complete search history.

(56) References Cited

U.S. PATENT DOCUMENTS 10,514,295 B2 * 12/2019 Nishio ...................... G01J 1/44
2005/0168720 A1   8/2005 Yamashita et al.

FOREIGN PATENT DOCUMENTS

| JP | S62-161074 A | 7/1987 |
| JP | H10-160837 A | 6/1998 |
| JP | 2001-74842 A | 3/2001 |
| JP | 2005-221336 A | 8/2005 |
| JP | 2007-10432 A | 1/2007 |
| JP | 2007-256191 A | 10/2007 |
| JP | 2013160545 A | 8/2013 |

OTHER PUBLICATIONS

International Search Report for related International Application No. PCT/JP2016/070533, dated Oct. 4, 2016; English translation provided; 4 pages.

* cited by examiner

| NAME | DEFINITION | FORMAT | DEFAULT | UNIT |
|---|---|---|---|---|
| $nSeg$ | SEGMENT PERIOD | unsigned | 8192 | Tsys |
| $dTrg$ | TRIGGER DELAY | signed | 0 | Tsys |
| $wTrg$ | TRIGGER WIDTH | unsigned | 64 | Tsys |
| $dGate$ | GATE DELAY | signed | 0 | Tsys |
| $wGate$ | GATE WIDTH | unsigned | 1024 | Tsys |

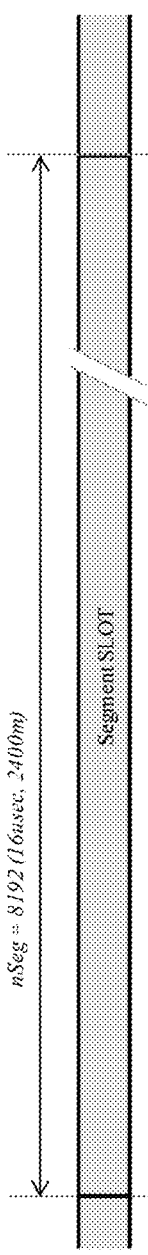

| NAME | DEFINITION | FORMAT | DEFAULT | UNIT |
|---|---|---|---|---|
| nPpr | NUMBER OF PULSE PER ROTATION | unsigned | 360 | pulse/rot |
| nRpf | REVOLUTIONS PER FRAME | unsigned | 1 | rot/frm |
| nSpf | SEGMENT PER FRAME | unsigned | 1800 | seg/frm |
| dSmpA | PHASE-A SAMPLE DELAY | signed | 0 | Tsys |
| dSmpZ | PHASE-Z SAMPLE DELAY | signed | 0 | Tsys |
| dSegZ | PHASE-Z SEGMENT DELAY | signed | 0 | Tsys |

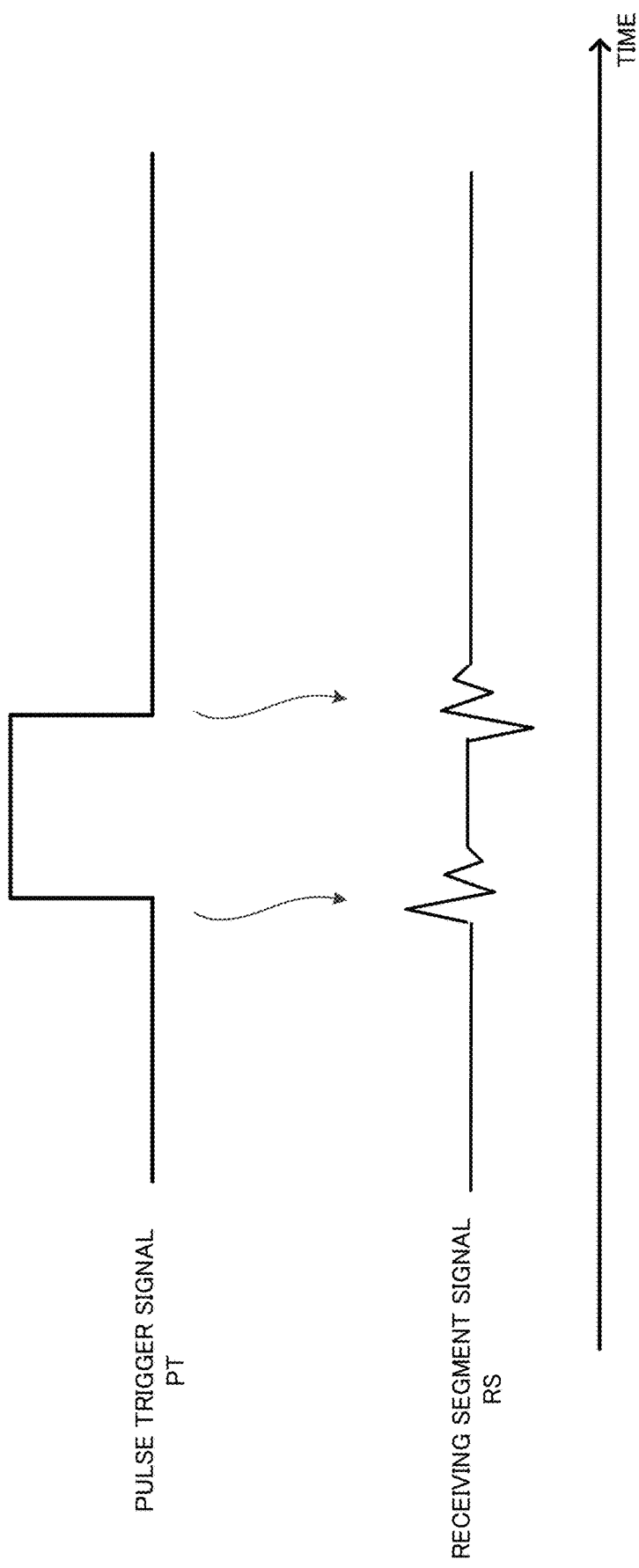

INFORMATION PROCESSING DEVICE, OPTICAL APPARATUS, CONTROL METHOD, PROGRAM AND STORAGE MEDIUM

CROSS-REFERENCE TO RELATED APPLICATIONS

This application is a U.S. National Stage entry of PCT Application No: PCT/JP2016/070533 filed Jul. 12, 2016, the contents of which are incorporated herein by reference.

TECHNICAL FIELD

The present invention relates to an information processing technology for an optical apparatus which uses a laser light.

BACKGROUND TECHNIQUE

Conventionally, there is widely used a ranging device which emits a pulsed beam to a target object of measurement to thereby measure the distance to the target object based on the timing of receiving the pulsed beam reflected by the target object. For example, Patent Reference-1 discloses such a ranging device that a trigger signal is generated by a control unit and that a pulsed beam is emitted onto a target object of measurement based on the trigger signal and that the pulsed beam reflected by the target object is received by a light receiving unit.

Patent Reference-1: Japanese Patent Application Laid-open under No. 2007-256191

DISCLOSURE OF INVENTION

Problem to be Solved by the Invention

Generally, the level of the trigger signal which defines the timing of emitting the pulsed laser light is much larger than the output level of the light receiving unit. Thus, it could be a cause of the error when the noise due to the high frequency component included in the rise and the fall of the trigger signal is overlapped with the output signal of the light receiving unit.

The above is an example of the problem to be solved by the present invention. An object of the present invention is to provide an information processing device capable of suitably reducing noise overlapped with the output signal of a light receiving unit.

Means for Solving the Problem

One invention is an information processing device which processes an output signal of a light receiving unit of an optical apparatus, the optical apparatus including: an emitting unit to emit laser light while changing an outgoing direction of the laser light; a reflection member arranged in a first outgoing direction, the reflection member reflecting the laser light; an absorption member arranged in a second outgoing direction, the absorption member absorbing the laser light;
and the light receiving unit to receive return light of the laser light, the information processing device including an estimation unit to estimate, on a basis of the output signal generated at a time when the outgoing direction of the laser light is the first outgoing direction and the output signal generated at a time when the outgoing direction of the laser light is the second outgoing direction, a signal regarding the return light which is reflected by the absorption member.

Another invention is an optical apparatus including: an emitting unit to emit laser light while changing an outgoing direction of the laser light; a reflection member arranged in a first outgoing direction, the reflection member reflecting the laser light; an absorption member arranged in a second outgoing direction, the absorption member absorbing the laser light; a light receiving unit to receive return light of the laser light; and an estimation unit to estimate, on a basis of the output signal generated at a time when the outgoing direction of the laser light is the first outgoing direction and the output signal generated at a time when the outgoing direction of the laser light is the second outgoing direction, a signal regarding the return light which is reflected by the absorption member.

Still another invention is a control method executed by an optical apparatus, the optical apparatus including: an emitting unit to emit laser light while changing an outgoing direction of the laser light; a reflection member arranged in a first outgoing direction, the reflection member reflecting the laser light; an absorption member arranged in a second outgoing direction, the absorption member absorbing the laser light; and a light receiving unit to receive return light of the laser light, the control method including an estimation process to estimate, on a basis of the output signal generated at a time when the outgoing direction of the laser light is the first outgoing direction and the output signal generated at a time when the outgoing direction of the laser light is the second outgoing direction, a signal regarding the return light which is reflected by the absorption member.

Still another invention is a program executed by a computer which processes an output signal of a light receiving unit of an optical apparatus, the optical apparatus including: an emitting unit to emit laser light while changing an outgoing direction of the laser light; a reflection member arranged in a first outgoing direction, the reflection member reflecting the laser light; an absorption member arranged in a second outgoing direction, the absorption member absorbing the laser light; and the light receiving unit to receive return light of the laser light, the program making the computer function as an estimation unit to estimate, on a basis of the output signal generated at a time when the outgoing direction of the laser light is the first outgoing direction and the output signal generated at a time when the outgoing direction of the laser light is the second outgoing direction, a signal regarding the return light which is reflected by the absorption member.

BRIEF DESCRIPTION OF THE DRAWINGS

FIGS. 6A to 6F illustrate a graph indicative of the relationship between the output signal of an ADC and its gate.

FIG. 9 illustrates the relationship between the pulse trigger signal and the receiving segment signal.

DETAILED DESCRIPTION OF THE PREFERRED EMBODIMENTS

Figure 1:
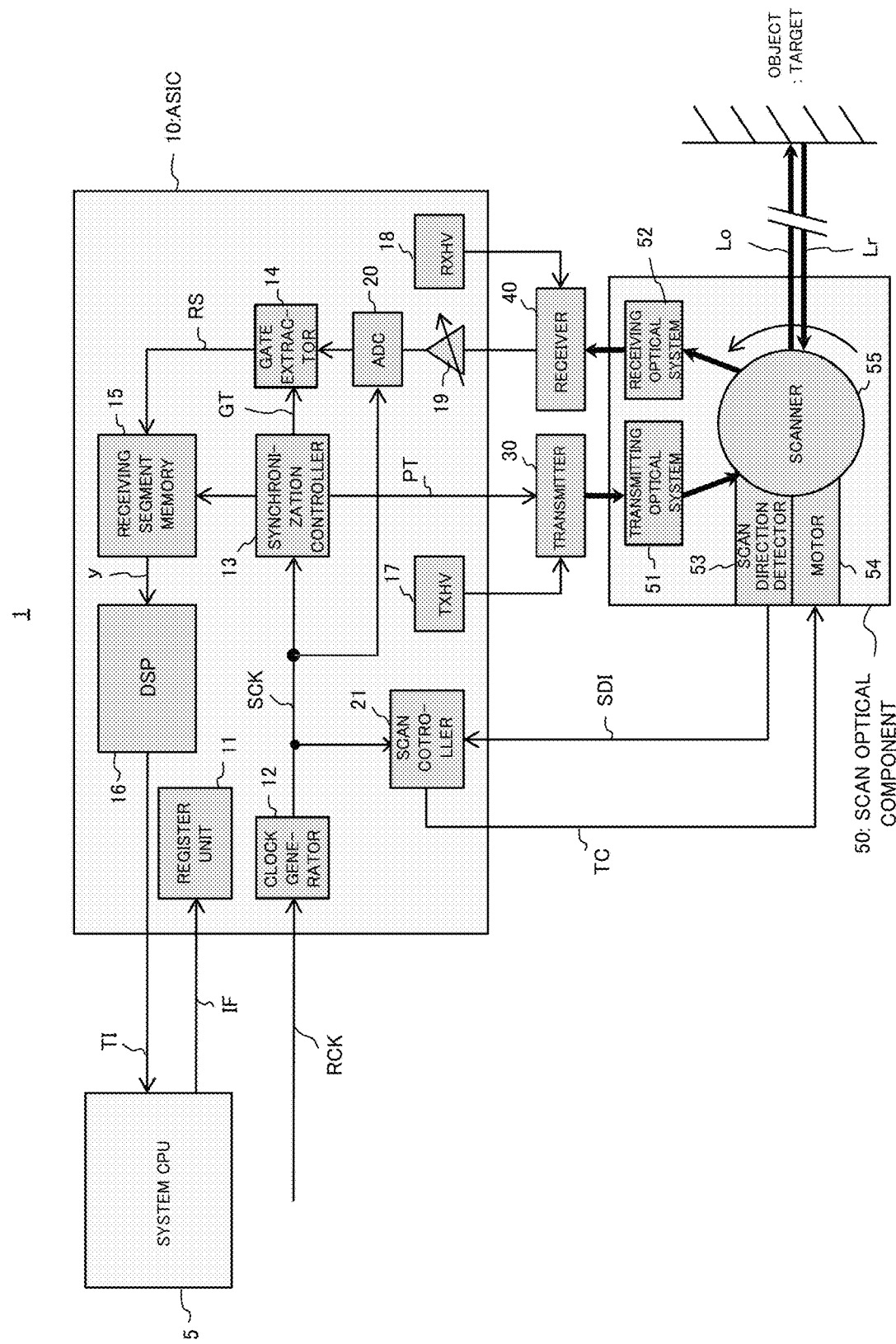
FIG. 1 illustrates an overall configuration of a LIDAR according to an embodiment.

According to a preferable embodiment of the present invention, there is provided an information processing device which processes an output signal of a light receiving unit of an optical apparatus, the optical apparatus including: an emitting unit to emit laser light while changing an outgoing direction of the laser light; a reflection member arranged in a first outgoing direction, the reflection member reflecting the laser light; an absorption member arranged in a second outgoing direction, the absorption member absorbing the laser light; and the light receiving unit to receive return light of the laser light, the information processing device including an estimation unit to estimate, on a basis of the output signal generated at a time when the outgoing direction of the laser light is the first outgoing direction and the output signal generated at a time when the outgoing direction of the laser light is the second outgoing direction, a signal regarding the return light which is reflected by the absorption member.

The above information processing device processes an output signal of a light receiving unit of an optical apparatus and includes an estimation unit, wherein the optical apparatus includes an emitting unit to emit laser light while changing an outgoing direction of the laser light, a reflection member and an absorption member in addition to the light receiving unit. The estimation unit estimates, on a basis of the output signal generated at a time when the outgoing direction of the laser light is the first outgoing direction that the reflection member is arranged and the output signal generated at a time when the outgoing direction of the laser light is the second outgoing direction that the absorption member is arranged, a signal regarding the return light which is reflected by the absorption member. According to this mode, even when the intensity of the return light that is the laser light reflected by the absorption member is high to the extent being not negligible, it is possible to estimate the signal regarding the return light which is reflected by the absorption member based on the output signal generated at the time when the outgoing direction of the laser light is the first outgoing direction and the output signal generated at the time when the outgoing direction of the laser light is the second outgoing direction. This leads to a suitable estimation of the noise signal to be mentioned later.

In one mode of the information processing device, the emitting unit emits the laser light based on a first signal, wherein the estimation unit includes a noise estimation unit, the noise estimation unit estimating a noise signal generated due to the first signal by subtracting the signal estimated by the estimation unit from the output signal generated at the time when the outgoing direction of the laser light is the second outgoing direction. In this way, in such a case that the information processing device estimates the noise signal, which is overlapped with the output signal of the light receiving unit, based on the output signal of the light receiving unit in a state that the absorption member is irradiated, the information processing device can accurately estimate the noise signal by omitting the influence of the return light of the laser light reflected by the absorption member.

In another mode of the information processing device, the estimation unit estimates the signal regarding the return light which is reflected by the absorption member by estimating an amplitude of a component which correlates with the output signal generated at the time when the outgoing direction of the laser light is the first outgoing direction, the component being extracted from the output signal generated at the time when the outgoing direction of the laser light is the second outgoing direction. According to this mode, the information processing device calculates the correlation between the output signal of the light receiving unit generated at the time of receiving the return light returned by the reflection member and the output signal generated at the time of receiving the return light returned by the absorption member. Thereby, the information processing device can suitably estimate the amplitude of the return light of the laser light returned by the absorption member. It is noted that the reflection member and the absorption member are arranged at such positions that distance between each of them and the emitting unit is substantially equivalent to each other. In this case, since the peak positions of these output signals outputted by the light receiving unit substantially coincide with each other, it is easy to calculate the correlation.

In still another mode of the information processing device, the output signal is converted into a real vector with a common vector length with respect to each emitting angle of the laser light, wherein the estimation unit estimates the amplitude based on a scalar product of the output signal generated at the time when the outgoing direction of the laser light is the first outgoing direction and the output signal generated at the time when the outgoing direction of the laser light is the second outgoing direction. According to this mode, the information processing device can suitably calculate the correlation between the output signal of the light receiving unit generated at the time of receiving the return light returned by the reflection member and the output signal generated at the time of receiving the return light returned by the absorption member, thus suitably estimating the above amplitude.

In still another mode of the information processing device, the estimation unit calculates an estimate signal as the signal regarding a return light which is reflected by the absorption member, a peak position of the estimate signal coinciding with a peak position of the output signal generated at the time when the outgoing direction of the laser light is the second outgoing direction, the amplitude of the estimate signal at the peak position being equal to the estimated amplitude. According to this mode, the information processing device can suitably estimate the return light reflected by the absorption member.

According to another preferable embodiment of the present invention, there is provided an optical apparatus including: an emitting unit to emit laser light while changing an outgoing direction of the laser light; a reflection member arranged in a first outgoing direction, the reflection member reflecting the laser light; an absorption member arranged in a second outgoing direction, the absorption member absorbing the laser light; a light receiving unit to receive return light of the laser light; and an estimation unit to estimate, on a basis of the output signal generated at a time when the outgoing direction of the laser light is the first outgoing direction and the output signal generated at a time when the outgoing direction of the laser light is the second outgoing direction, a signal regarding the return light which is reflected by the absorption member. According to this mode, the optical apparatus can suitably estimate a signal regarding the return light which is reflected by the absorption member and which affects the output signal outputted by the light receiving unit.

According to another preferable embodiment of the present invention, there is provided a control method executed by an optical apparatus, the optical apparatus including: an emitting unit to emit laser light while changing an outgoing direction of the laser light; a reflection member arranged in a first outgoing direction, the reflection member reflecting the laser light; an absorption member arranged in a second outgoing direction, the absorption member absorbing the laser light; and a light receiving unit to receive return light of the laser light, the control method including an estimation process to estimate, on a basis of the output signal generated at a time when the outgoing direction of the laser light is the first outgoing direction and the output signal generated at a time when the outgoing direction of the laser light is the second outgoing direction, a signal regarding the return light which is reflected by the absorption member. By executing the control method, the optical apparatus can suitably estimate a signal regarding the return light which is reflected by the absorption member and which affects the output signal outputted by the light receiving unit.

According to another preferable embodiment of the present invention, there is provided a program executed by a computer which processes an output signal of a light receiving unit of an optical apparatus, the optical apparatus including: an emitting unit to emit laser light while changing an outgoing direction of the laser light; a reflection member arranged in a first outgoing direction, the reflection member reflecting the laser light; an absorption member arranged in a second outgoing direction, the absorption member absorbing the laser light; and the light receiving unit to receive return light of the laser light, the program making the computer function as an estimation unit to estimate, on a basis of the output signal generated at a time when the outgoing direction of the laser light is the first outgoing direction and the output signal generated at a time when the outgoing direction of the laser light is the second outgoing direction, a signal regarding the return light which is reflected by the absorption member. By executing the program, the computer can suitably estimate a signal regarding the return light which is reflected by the absorption member and which affects the output signal outputted by the light receiving unit. Preferably, the program can be treated in a state that it is stored in a storage medium.

EMBODIMENT

Now, preferred embodiments of the present invention will be described below with reference to the attached drawings.
<Basic Explanation>
First, a description will be given of the basic configuration of a LIDAR according to the embodiment.
(1) Entire Configuration
FIG. 1 illustrates an entire configuration of a LIDAR 1 according to the embodiment. The LIDAR 1 scans peripheral space by properly controlling the outgoing direction (hereinafter, referred to as "scan direction") of pulsed light beams repeatedly emitted and monitors the return light thereof. Thereby, the LIDAR 1 recognizes information (e.g., the distance, the existence probability or the reflection rate) associated with an object situated in the vicinity. Specifically, the LIDAR 1 emits a pulsed light beam (hereinafter, referred to as "outgoing light") Lo and receives the pulsed light beam (hereinafter, referred to as "return light") Lr reflected by an external object (target) to thereby generate information associated with the object. The LIDAR 1 is an example of the "optical apparatus" according to the present invention.

As illustrated in FIG. 1, the LIDAR 1 mainly includes a system CPU 5, an ASIC 10, a transmitter 30, a receiver 40 and a scan optical component 50. The transmitter 30 repeatedly outputs a pulsed laser light with the width of approximately 5 nsec in response to the pulse trigger signal PT supplied from the ASIC 10. The pulsed laser light outputted by the transmitter 30 is supplied to the scan optical component 50.

The scan optical component 50 emits the pulsed laser light outputted by the transmitter 30 to a proper direction while collecting the return light Lr and supplying the return light Lr to the receiver 40, wherein the return light Lr is returned after the reflection or diffusion at an object in a space. The scan optical component 50 is an example of the "emitting unit" according to the present invention. The receiver 40 supplies the ASIC 10 with a signal in accordance with the intensity of the return light Lr. The receiver 40 is an example of the "light receiving unit" according to the present invention.

The ASIC 10 estimates and outputs parameter(s) (e.g., distance) associated with an object situated in the scan space by analyzing the output signal of the receiver 40. The ASIC 10 also controls the scan optical component 50 to provide a proper scan. Furthermore, the ASIC 10 supplies the transmitter 30 and the receiver 40 with high voltages necessary for them, respectively.

The system CPU 5 at least performs an initial setup, surveillance, and/or control of the ASIC 10 through a communication interface. Other functions thereof depend on the application. For the simplest LIDAR, the system CPU 5 only converts the target information TI outputted by the ASIC 10 into a proper formats and outputs it. For example, after converting the target information TI into point cloud formats with high flexibility, the system CPU 5 outputs it through a USB interface.

Figure 2A:
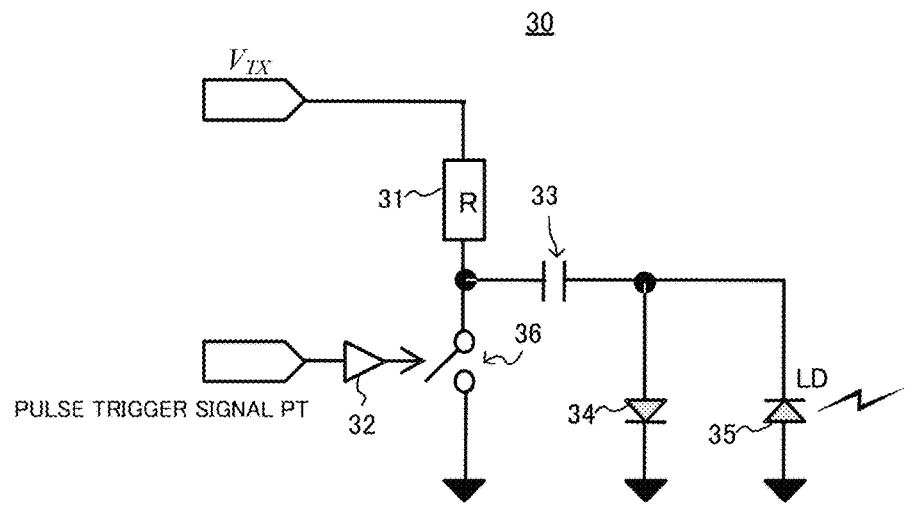
FIGS. 2A and 2B illustrate configurations of a transmitter and a receiver.

(2) Transmitter
The transmitter 30 repeatedly outputs a pulsed laser light with the width of approximately 5 nsec in response to the pulse trigger signal PT supplied from the ASIC 10. FIG. 2A illustrates the configuration of the transmitter 30. The transmitter 30 includes a charging resistor 31, a driver circuit 32, a capacitor 33, a charging diode 34, a laser diode (LD) 35 and a CMOS switch 36.

The pulse trigger signal PT inputted from the ASIC 10 drives the CMOS switch 36 via the driver circuit 32. The driver circuit 32 is provided for prompt driving of the COMS switch 36. The COMS switch is open during a deassertion period of the pulse trigger signal PT and the capacitor 33 in the transmitter 30 is charged with the high voltage $V_{TX}$ supplied from the ASIC 10. In contrast, during an assertion period of the pulse trigger signal PT, the CMOS switch 36 is close and the charge stored on the capacitor 33 is discharged through the LD 35. As a result, a pulsed laser light is outputted from the LD 35.

(3) Receiver

Figure 2B:
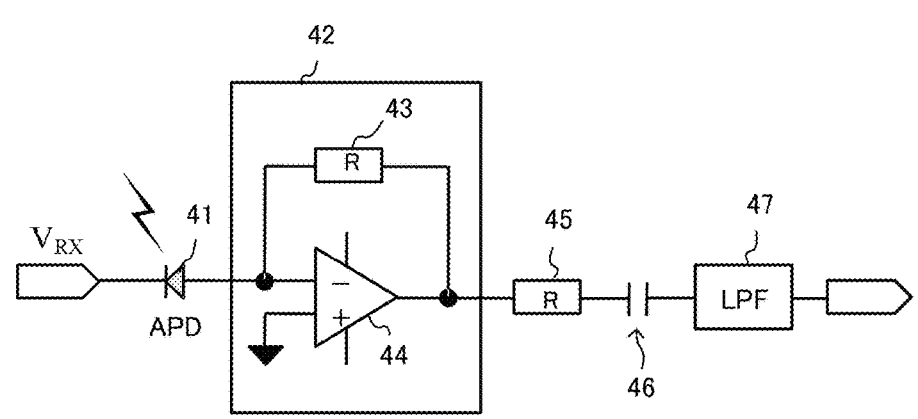

The receiver 40 outputs a voltage signal proportional to the intensity of the return light Lr returned from an object. Generally, since light detecting elements such as a PD and an APD output current, the receiver 40 converts (i.e., performs I/V conversion) the current into the voltage to output it. FIG. 2B illustrates a configuration of the receiver 40. The receiver 40 includes an APD (Avalanche Photodiode) 41, an I/V converter 42, a resistor 45, a capacitor 46 and a low pass filter (LPF) 47. The I/V converter 42 includes a feedback resistor 43 and an operational amplifier 44.

According to the embodiment, the APD 41 is used as a light detecting element. The high voltage $V_{RX}$ supplied from the ASIC 10 is applied to the APD 41 as a reverse bias and the detection current proportional to the return light Lr returned from an object passes through the APD 41. A high gain of the APD 41 can be obtained by applying a revers bias which approximates the breakdown voltage of the APD 41, which enables the APD 41 to detect even a weak return light Lr. The LPF 47 situated at the last position is provided for restricting the bandwidth of the signal prior to sampling by the ADC 20 in the ASIC 10. According to the embodiment, the sampling frequency of the ADC 20 is 512 MHz and the cutoff frequency of the LPF 47 is approximately 250 MHz.

(4) Scan Optical Component

Figures 3, 4:
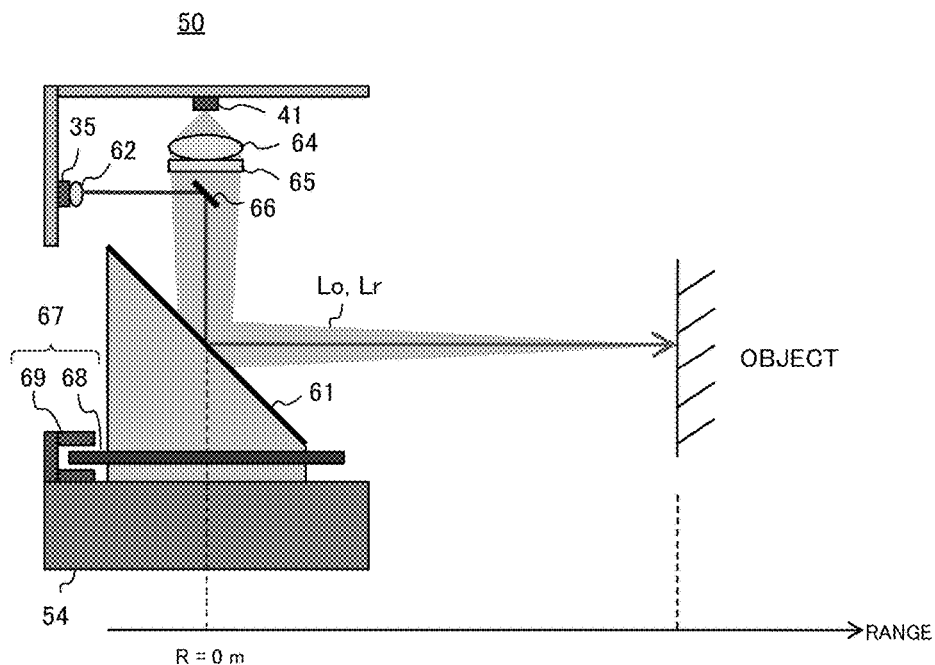
FIG. 3 illustrates a configuration of a scan optical component.
FIG. 4 illustrates a register configuration example of control signals generated by a synchronization controller.

The scan optical component 50 emits the pulsed laser light inputted from the transmitter 30 as the outgoing light Lo to a proper direction while collecting the return light Lr and supplying the return light Lr to the receiver 40, wherein the return light Lr is the outgoing light Lo returned after the reflection or diffusion at an object in a space. FIG. 3 illustrates a configuration example of the scan optical component 50. The scan optical component 50 includes a revolving mirror 61, a collimator lens 62, a collecting lens 64, an optical filter 65, a coaxial mirror 66 and a rotary encoder 67.

The pulsed laser light outputted from the LD 35 of the transmitter 30 enters the collimator lens 62. The collimator lens 62 collimates the laser light within a proper divergent angle (generally, approximately within the range of 0 to 1 degree). The light emitted from the collimator lens 62 is reflected by the small coaxial mirror 66 towards the downward direction to thereby enter the rotational axis (center) of the revolving mirror 61. The revolving mirror 61 reflects the laser light which is incident from the upward direction to the horizontal direction to thereby emit the laser light into a scan space. The revolving mirror 61 is provided at the revolving part of the motor 54 and the laser light reflected by the revolving mirror 61 scans, as the outgoing light Lo, a horizontal plane along with the rotation of the motor 54.

The return light Lr, which goes back to the LIDAR 1 through the reflection or diffusion at the object situated in the scan space, is reflected by the revolving mirror 61 towards the upward direction to enter the optical filter 65. Together with the return light Lr, the background light, which is generated through the irradiation of the object by the sun, also enters the optical filter 65. The optical filter is provided to selectively eliminate such background light. Specifically, the optical filter 65 selectively passes components having a wavelength within the range of the wavelength (905 nm according to the embodiment) of the outgoing light Lo plus or minus 10 nm. In such a case that the passband width of the optical filter 65 is large, a lot of background light enter the following receiver 40. As a result, unfortunately, a large DC current component appears in the output of the APD 41 of the receiver 40 and the shot noise (background light shot noise) due to the DC component degrades the signal-to-noise ratio. In contrast, in a case that the passband width is too narrow, the outgoing light Lo itself is also suppressed. The collecting lens 64 collects the light which passes through the optical filter 65 and then supplies it to the APD 41 of the receiver 40.

The rotary encoder 67 is provided on the motor 54 to detect the scan direction. The rotary encoder 67 includes a spinning disk 68 provided on the revolving part of the motor and a code detector 69 mounted on the base of the motor. Slits which illustrate rotational angles of the motor 54 are marked on the outer circumference of the spinning disk 68. The code detector 69 reads the slits and outputs the result. Specifications of the rotary encoder 67 and the motor control based on the output thereof will be explained later.

According to the above configuration, the collimator lens 62 constitutes the transmitting optical system 51 in FIG. 1, the revolving mirror 61 and the motor 54 constitute the scanner 55 in FIG. 1, the optical filter 65 and the collecting lens 64 constitute the receiving optical system 52 in FIG. 1 and the rotary encoder 67 constitutes the scan direction detector 53 in FIG. 1.

(5) ASIC

The ASIC 10 controls the timing of the pulsed laser light and performs the AD conversion of the APD output signal. Through a proper signal processing on the output of the AD conversion, the ASIC 10 estimates a parameter (e.g., distance and return light intensity) relating to the object and outputs the estimate result to an external device. As illustrated in FIG. 1, the ASIC 10 includes a register unit 11, a clock generator 12, a synchronization controller 13, a gate extractor 14, a receiving segment memory 15, a DSP 16, a transmitter high voltage generator (TXHV) 17, a receiver high voltage generator (RXHV) 18, a pre-amplifier 19 and an AD converter 20 and a scan controller 21.

On the register unit 11, there are provided communication registers capable of communicating with the system CPU 5 that is an external processor. The registers provided on the register unit 11 fall roughly into a R register which can only be referred to by an external and a W register which can be configured by an external. The R register mainly stores internal status values of the ASIC 10, and the system CPU 5 can monitor the internal status values of the ASIC 10 by reading the internal status values through a communication interface. In contrast, the w register stores various parameter values to be referred to in the ASIC 10. These parameter values can be determined by the system CPU 5 through the communication interface. It is noted that the communication registers may be implemented as a flip-flop circuit or may be implemented as a RAM.

The clock generator 12 generates the system clock SCK to supply it to each block in the ASIC 10. Most blocks in the ASIC 10 act in synchronization with the system clock SCK. The frequency of the system clock SCK according to the embodiment is 512 MHz. The system clock SCK is generated in a PLL (Phase Locked Loop) so as to synchronize with the reference clock RCK inputted from an external. Normally, a crystal oscillator is used as a generator of the reference clock RCK.

The TXHV 17 generates the DC (direct-current) high voltage (approximately 100 V) which is necessary for the transmitter 30. The high voltage is generated through a DCDC converter circuit which raises the low voltage (approximately 5V to 15V).

The RXHV 18 generates the DC (direct-current) high voltage (approximately 100 V) which is necessary for the receiver 40. The high voltage is generated through a DCDC converter circuit which raises the low voltage (approximately within the range of 5V to 15V).

Figure 5:
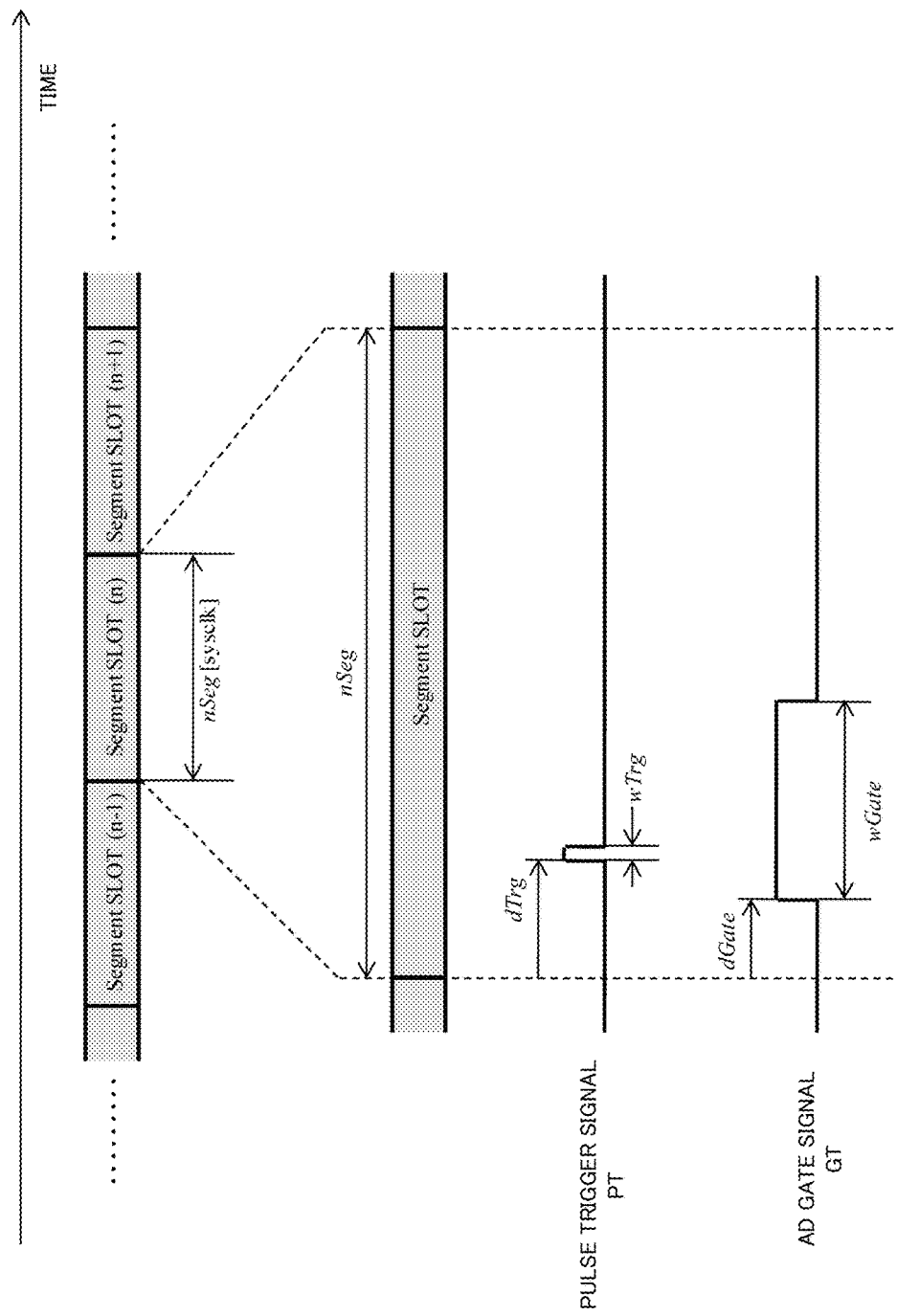
FIG. 5 illustrates temporal relationship between the control signals generated by a synchronization controller.

The synchronization controller 13 generates and outputs various control signals. The synchronization controller 13 according to the embodiment outputs two control signals, i.e., the pulse trigger signal PT and the AD gate signal GT. FIG. 4 illustrates a configuration example of these control signals and FIG. 5 illustrates the temporal relationship between the two control signals. As illustrated in FIG. 5, these control signals are generated in synchronization with evenly-divided time sections (segment slots). The time width (segment period) of each segment slot can be configured by use of "nSeg". Hereinafter, "nSeg=8192" is assumed in the embodiment if there is no mention of the segment period.

The pulse trigger signal PT is supplied to the transmitter 30 which is provided outside the ASIC 10. The transmitter 30 outputs the pulsed laser light in accordance with the pulse trigger signal PT. For the pulse trigger signal PT, the time delay "dTrg" from the start point of the segment slot and pulse width "wTrg" can be configured. It is noted that the transmitter 30 does not react if the pulse width wTrg is too narrow. Thus, the pulse width wTrg may be determined in consideration of the specifications of the transmitter 30 regarding the trigger response.

The AD gate signal GT is supplied to the gate extractor 14. As is mentioned below, the gate extractor 14 extracts each section, in which the AD gate signal GT is asserted, from the ADC output signal inputted from the ADC 20 and then stores it on the receiving segment memory 15. For the AD gate signal GT, the delay time "dGate" from the start point of the segment slot and the gate width "wGate" can be configured.

The pre-amplifier 19 amplifies the analog voltage signal inputted from the receiver 40 which is provided outside the ASIC 10 and supplies it to the following ADC 20. It is noted that the gain of the voltage of the pre-amplifier 19 can be configured through the w register.

The ADC 20 converts the output signal of the pre-amplifier 19 into a digital signal through the AD conversion. According to the embodiment, the system clock SCK is used as the sampling clock of the ADC 20 and therefore the input signal of the ADC 20 is sampled at 512 MHz.

The gate extractor 14 extracts, from the ADC output signal inputted from the ADC 20, each section where the AD gate signal GT is asserted and stores it on the receiving segment memory 15. Each sectional signal extracted by the gate extractor 14 is referred to as "receiving segment signal RS". In other words, the receiving segment signal RS is a real vector whose vector length is equal to the gate width wGate. The gate extractor 14 is an example of the "sectional signal extracting unit" according to the present invention.

Here, a description will be given of the relationship between the ADC output signal and the receiving segment and the settings of the gate position. FIG. 6A illustrates a segment slot. As illustrated in FIG. 6B, the pulse trigger signal PT is asserted with a delay time dTrg from the start point of the segment slot. According to the example illustrated in FIGS. 6A to 6E, the pulse trigger signal PT is asserted at the start point of the segment slot since "dTrg=0" is satisfied. FIG. 6C illustrates an output signal (i.e., receiving segment signal RS) of the ADC 20 in a case that an object is provided at the scan origin point of a LIDAR. Namely, FIG. 6C illustrates a receiving segment signal RS in a case that the target distance (moving radius R) is 0 meter.

As illustrated, even when the R=0 m is satisfied, the receiving segment signal RS is monitored in a state that the rise of the receiving segment signal RS lags behind the rise of the pulse trigger signal PT by the system delay $D_{SYS}$. It is noted that examples of the cause of the generation of the system delay $D_{SYS}$ include an electronic delay of the LD driver circuit in the transmitter 30, an optical delay of the transmitting optical system 51, an optical delay of the receiving optical system 52, an electronic delay of the receiver 40 and a conversion delay of the ADC 20.

FIG. 6D illustrates the receiving segment signal RS in a case that the object is situated away by the moving radius R. In this case, compared to FIG. 6C, the delay increases by the round-trip time of the light between the scan origin point and the object. This increase of the delay is so-called "TOF (Time Of Flight)". Given "D" stands for the TOF delay, the moving radius R can be calculated according to the following equation.

$$R=D(c/2)/Fsmp$$

FIG. 6F illustrates the AD gate signal GT at the time when "dGate=0" is satisfied. As mentioned above, the gate extractor 14 extracts only the section where the AD gate signal GT is asserted from the output signal of the ADC 20. The DSP 16 to be mentioned later estimates parameter (s) relating to the object only based on the extracted section. Thus, when the TOF delay time is long, the pulse component corresponding to the return light from the object shifts out of the gate, thus leading to inability to correctly estimate the parameter(s. In order to correctly estimate the parameter(s), the TOF delay time is required to satisfy the following equation.

$$D \leq D_{MAX} \equiv w\text{Gate} - D_{SYS} - L_{IR}$$

"$L_{IR}$" stands for the length of the impulse response of the system and "$D_{MAX}$" stands for the maximum TOF delay time which makes the correct parameter estimation possible. FIG. 6E illustrates the receiving segment signal RS at the time when the TOF delay time is equal to the maximum TOF delay time.

Instead of the example illustrated in FIGS. 6A to 6F, the gate delay dGate may be set to the same value as the system delay time. According to the above setting, it is possible to correctly estimate the parameters even when the object is distant.

Figures 7A, 7B:
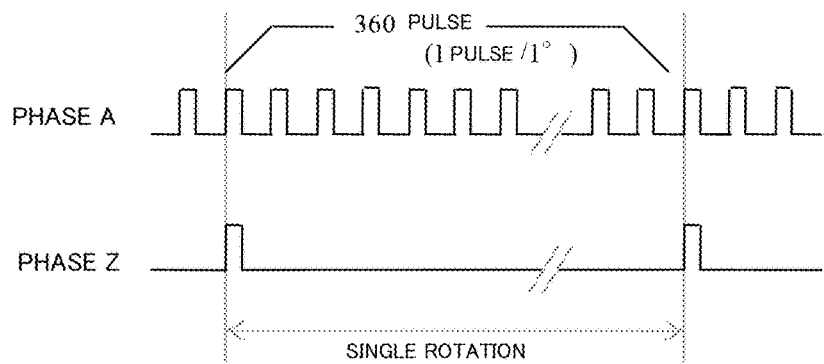
FIGS. 7A and 7B illustrate the temporal relationship between pulse trains of a rotary encoder.

The scan controller 21 monitors the output of the rotary encoder 67 which is provided outside the ASIC 10 and controls the rotation of the motor 54 based thereon. Specifically, the scan controller 21 supplies the torque control signal TC to the motor 54 on the basis of the scan direction information SDI outputted from the rotary encoder 67 (scan direction detector 53) of the scan optical component 50. The rotary encoder 67 according to the embodiment outputs two pulse trains (hereinafter, referred to as "encoder pulses"), the A-phase and the Z-phase. FIG. 7A illustrates the temporal relationship between the both pulse trains. As illustrated, as for the A-phase, one pulse is generated and outputted per one degree of rotation of the motor 54. Thus, 360 A-phase encoder pulses are generated and outputted per one rotation of the motor 54. In contrast, as for the Z-phase, one pulse is generated and outputted per one rotation of the motor 54 at a predetermined rotational angle of the motor 54.

The scan controller 21 measures the time of the rise of the encoder pulses to count the counter value of the system clock SCK, and controls the torque of the motor 54 so that the counter value becomes a predetermined value. Namely, the scan controller 21 performs a PLL control of the motor 54 so that the encoder pulses and the segment slot have a desirable temporal relationship.

The temporal relationship between the encoder pulses and the segment slot can be configured by the W register illustrated in FIG. 7B. The number of the A-phase encoder pulses per rotation of the motor 54 is set to the parameter "nPpr". The parameter depends on the specifications of the rotary encoder 67 and is set to 360 according to the embodiment. The parameter "nRpf" specifies the number of rotations per frame and the parameter "nRpf" specifies the number of segments per frame. The parameters "dSmpA" and "dSmpZ" are prepared for adjustment of the temporal relationship between the rise of the encoder pulses and the segment slot by the sample clock and the delay time of the encoder pulses from the start point of the segment slot can be defined by these parameters. In contrast, the parameter "dSegZ" is prepared for adjustment of the temporal relationship between the rise of the Z-phase and the frame by the segment.

Figure 8:
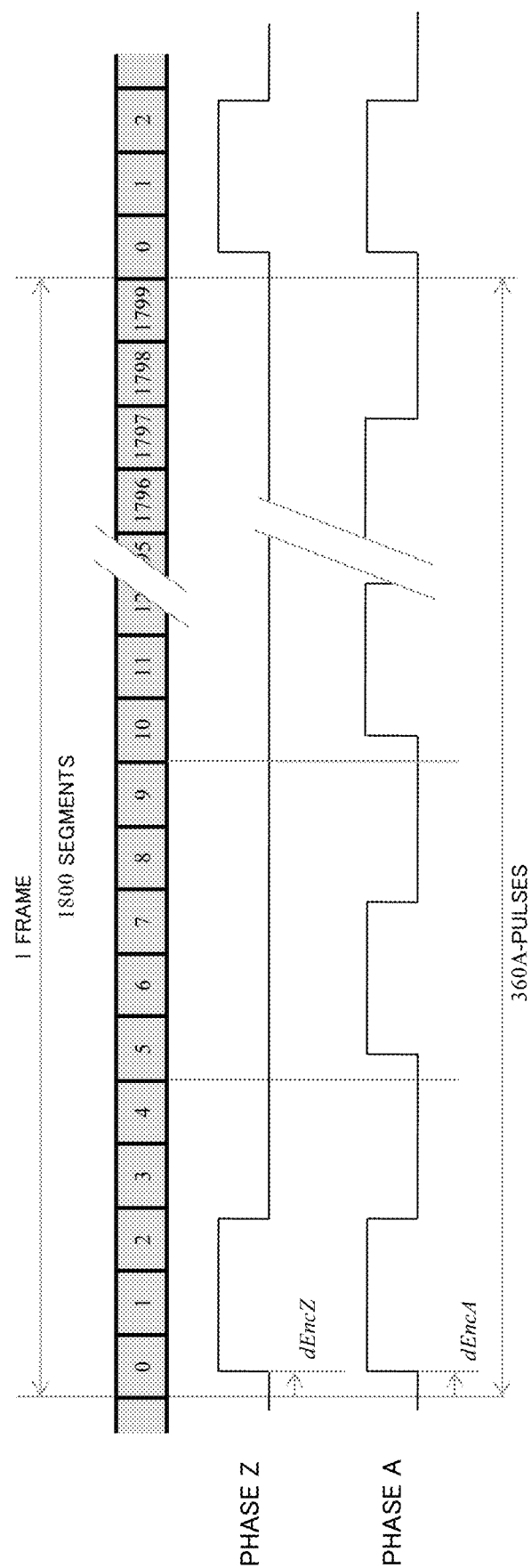
FIG. 8 illustrates the temporal relationship between the encoder pulses and the segment slot at steady state.

FIG. 8 illustrates the temporal relationship between the encoder pulses and the segment slot at a steady state. As illustrated, for default configuration, 1800 segments constitute one frame and the motor 54 revolves one time per frame.

(6) DSP

DSP 16 sequentially reads out the receiving segment $y_{frm,\ seg}$ from the receiving segment memory 15 and processes it, wherein "frm" indicates the index of the frame and "seg" indicates the index of the segment. Hereinafter, these indexes are omitted when the misunderstanding is unlikely to occur. The receiving segment y is a real vector with the vector length wGate and is expressed as the following equation.

$$y=\{y_k: k=0,1,\ldots,wGate-1\}$$

The detailed configuration of the DSP 16 will be described in the following first to third embodiments. The DSP 16 is an example of the "information processing device" according to the present invention.

It is noted that receiving segment y (i.e., receiving segment signal RS) is overlapped with an interference signal (simply referred to as "synchronization interference") generated in synchronization with the segment period because of the electromagnetic propagation or influence caused by current in the ground. FIG. 9 illustrates the relationship between the pulse trigger signal PT and the receiving segment signal RS. FIG. 9 illustrates the receiving segment signal RS on the condition that the intensity of the return light Lr, which the APD 41 receives in response to emission of the outgoing light Lo at the time when the pulse trigger signal PT is asserted, is 0.

According to the example illustrated in FIG. 9, the receiving segment signal RS is overlapped with the high frequency component which is generated along with the rise and the fall of the pulse trigger signal PT. The TTL level of the pulse trigger signal PT is normally 3.3V or 5V and the level of the current which the APD 41 outputs is on the order of nA or pA. Thus, in this case, since the influence on the output of the APD 41 by the synchronization interference is relatively large, the synchronization interference can be a cause of the deterioration of the object detecting performance and/or ranging performance by use of the LIDAR 1. In response to the above issues, according to the first to third embodiments, the DSP 16 estimates the synchronization interference to suitably reduce the influence due to the synchronization interference. The pulse trigger signal PT is an example of the "first signal" according to the present invention and the synchronization interference is an example of the "noise signal" according to the present invention.

<First Embodiment>

First, a description will be given of the first embodiment. Summarily, the LIDAR 1 has an absorption member which absorbs the outgoing light Lo outputted in the particular scan direction and the DSP 16 estimates the synchronization interference by averaging the receiving segment y corresponding to the scan direction where the absorption member is irradiated. Then, the DSP 16 subtracts the synchronization interference estimate from the receiving segment y. Thereby, the DSP 16 suitably reduces the influence caused by the synchronization interference.

Figure 10A:
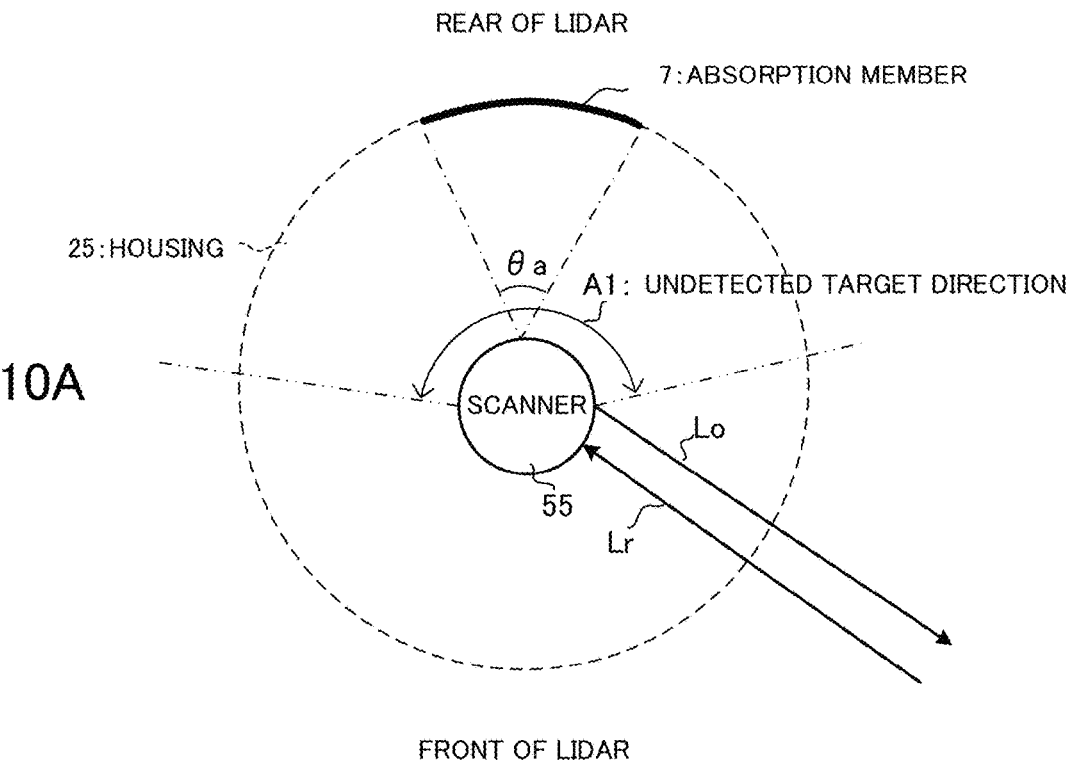
FIGS. 10A and 10B schematically illustrate the arrangement of an absorption member.

FIG. 10A schematically illustrates the arrangement of the absorption member 7. In FIG. 10A, the absorption member 7 is arranged at or near a housing 25 of the LIDAR 1, wherein the housing 25 houses the scanner 55 and is formed into a nearly cylindrical shape. It is noted that the absorption member 7 is provided on the undetected target direction (see arrow A1) that is the direction, which is extracted from the 360-degree irradiation direction of the outgoing light Lo by the scan of the scanner 55, other than the target direction of detection of an object by the LIDAR 1. According to the example illustrated in FIG. 10A, the absorption member 7 is situated on the wall surface of the housing 25, which is irradiated with the outgoing light Lo corresponding to an angle range "θa" (e.g., 60 degree), in the rear of the LIDAR 1. In this case, for example, the absorption member 7 is provided on the inside of a transparent cover of the housing 25 which the outgoing light Lo and the return light Lr pass through. In another example, the absorption member 7 may be a portion of the above transparent cover of the housing 25 processed (e.g., coated with black) to absorb the outgoing light Lo. Hereinafter, a time period, extracted from a period (i.e., one frame period) of one time around of the scan by the scanner 55, in which the APD 41 receives the outgoing light Lo reflected by the absorption member 7 is referred to as "reflection suppression period Ttag1". The reflection suppression period Ttag1 includes multiple segment periods corresponding to scan angles at which the outgoing light Lo is incident on the absorption member 7. information (e.g., segment index) associated with the above scan angles at which the outgoing light Lo is incident on the absorption member 7 is stored on the W register in advance so that the DSP 16 can refer to the information.

Figure 10B:
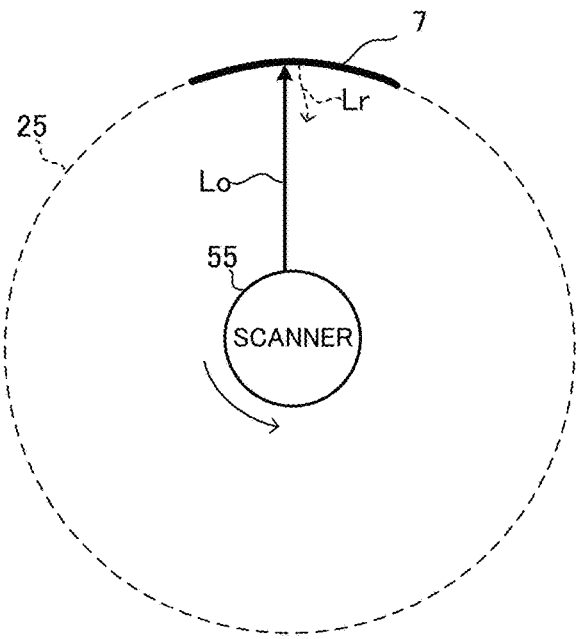

FIG. 10B illustrates a state that the outgoing light Lo is emitted towards the direction in which the absorption member 7 is arranged according to the example illustrated in FIG. 10A. when the outgoing light Lo is incident on the absorption member 7, the absorption member 7 absorbs at least a part of the outgoing light Lo to thereby achieve the reflection rate which does not affect the estimation of the synchronization interference to be mentioned later, i.e., the reflection rate (e.g., 0.1%) which generates the output signal of the APD 41 whose level is much smaller than the level of the synchronization interference. In this case, the return light Lr that is the outgoing light Lo reflected by the absorption member 7 reaches the scanner 55 in such a state that the intensity of the return light Lr is much smaller than the output level of the synchronization interference detected by the APD 41. It is noted that the return light Lr does not occur if the absorption member 7 has material which completely absorbs the outgoing light Lo.

For example, the surface of the absorption member 7 which reflects the outgoing light Lo is formed by material with a very low reflection rate. In another example, the absorption member 7 has multiple reflection structures and the inside surface (i.e., reflection surface) of each reflection structure is a beam damper with a low reflection rate.

Figure 11:
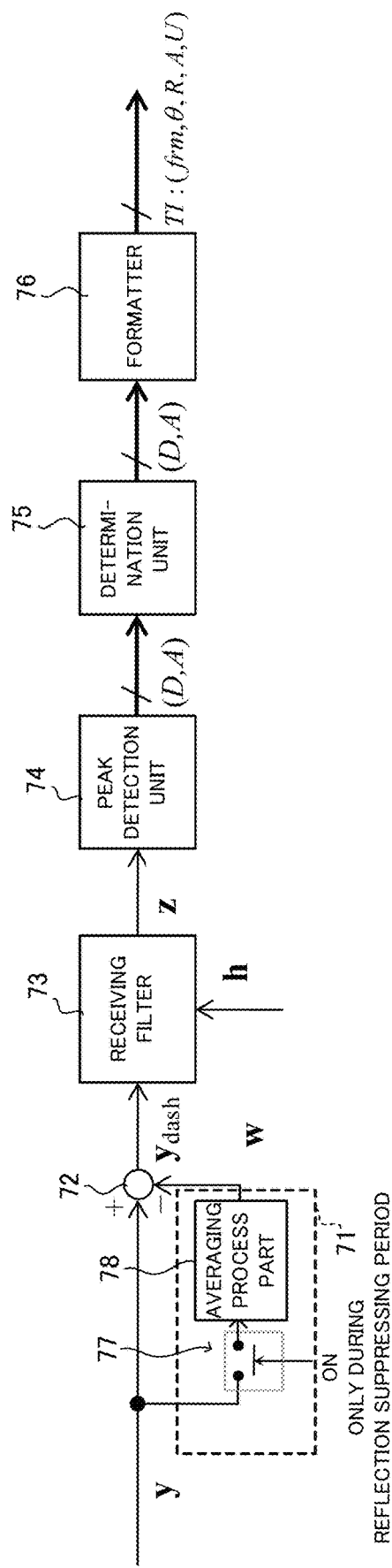
FIG. 11 illustrates a block diagram of the signal processing executed by a DSP according to the first embodiment.

FIG. 11 illustrates a block diagram of the signal processing executed by the DSP 16 according to the first embodiment. As illustrated in FIG. 11, the DSP 16 according to the first embodiment includes a synchronization interference estimation unit 71, a subtractor 72, a receiving filter 73, a peak detection unit 74, a determination unit 75 and a formatter 76. The DSP 16 sequentially read out the receiving segment y from the receiving segment memory 15 and processes it.

The synchronization interference estimation unit 71 averages the receiving segment y generated during the reflection suppression period Ttag1 and supplies the averaged receiving segment y as an estimate (referred to as "synchronization interference estimate w") of the synchronization interference to the subtractor 72. A detail description of the synchronization interference estimation unit 71 will be described below. The subtractor 72 subtracts the synchronization interference estimate w supplied from the synchronization interference estimation unit 71 from the receiving segment y. Then, the subtractor 72 supplies the receiving filter 73 with the receiving segment y (referred to as "corrected receiving segment $y_{dash}$" after the subtraction of the synchronization interference estimate w.

The receiving filter 73 convolves (does a circular convolution) the corrected receiving segment $y_{dash}$ with an impulse response "h" to thereby calculate a filtered segment "z". The peak detection unit 74 detects such a point (i.e., peak point) that the amplitude is maximized and then outputs the delay (delay time) "D" and the amplitude "A" with respect to the peak point. The determination unit 75 selectively transmits only points whose amplitude A is larger than a threshold "tDet". The formatter 76 converts the delay D, the amplitude A, and frame index frm and the segment index seg of the target segment into appropriate forms to output it as the target information TI to the system CPU 5.

Hereinafter, a detail description will be given of each block.

The synchronization interference estimation unit 71 includes a switch 77 and an averaging process part 78. The switch 77 is a switch controlled to be the on-state only during the reflection suppression period Ttag1 and supplies the receiving segment y generated during the reflection suppression period Ttag1 to the averaging process part 78. It is noted that the switch 77 does not have to be the on-state during the whole reflection suppression period Ttag1. Instead, the switch 77 may be controlled to be the on-state during a part of the reflection suppression period Ttag1.

The averaging process part 78 averages the receiving segment y supplied during a period when the switch is on-state and then supplies the subtractor 72 with the averaged receiving segment y as the synchronization interference estimate w. The synchronization interference estimate w is a real vector with the vector length wGate. In this case, for example, the averaging process part 78 accumulates the receiving segment y sequentially provided from the switch 77 during one frame period and calculates the synchronization interference estimate w that is the averaged receiving segment y calculated by dividing the accumulated receiving segment y by the number of the accumulated receiving segment y. In another example, the averaging process part 78 calculates the synchronization interference estimate w by averaging the averaged receiving segment y, that is an average of the receiving segment y during one frame period, through an IIR filter in the frame direction (i.e., among different frame indexes).

The receiving filter 73 calculates the filtered segment z by convolving the corrected receiving segment $y_{dash}$ with the impulse response h. The impulse response h of the receiving filter 73 can be configured by W register. For example, the impulse response h is determined by the system CPU 5 in advance so that the SNR at the filter output is large. For example, the impulse response h is determined to satisfy the following equation. The configuration according to the equation can achieve an optimal performance (high SNR) provided that the noise is white noise and the total system impulse response is short enough for the gate width wGate.

$$h = \{h_k : k = 0, 1, \ldots, N-1\}$$

$$g = \{g_k : k = 0, 1, \ldots, N-1\}$$

$$N = wGate$$

$$h_k = \begin{cases} g_0 & \text{for } k = 0 \\ g_{N-k} & \text{for } k = 1, 2, \ldots, N-1 \end{cases}$$

Regarding the above equation (referred to as "relational equation A"), the reference receiving pulse "g" is the waveform of the receiving segment monitored in a case that a target object is placed at the scan origin point (R=0 m) and also represents the impulse response of the total system which includes the transmitter 30 and the receiver 40. If it is actually not feasible to place the object at the scan origin point, the reference receiving pulse can be equivalently measured, for example, through mathematical time shift of the waveform of the receiving segment measured at the time when "R=1 m" is satisfied.

Figure 12:
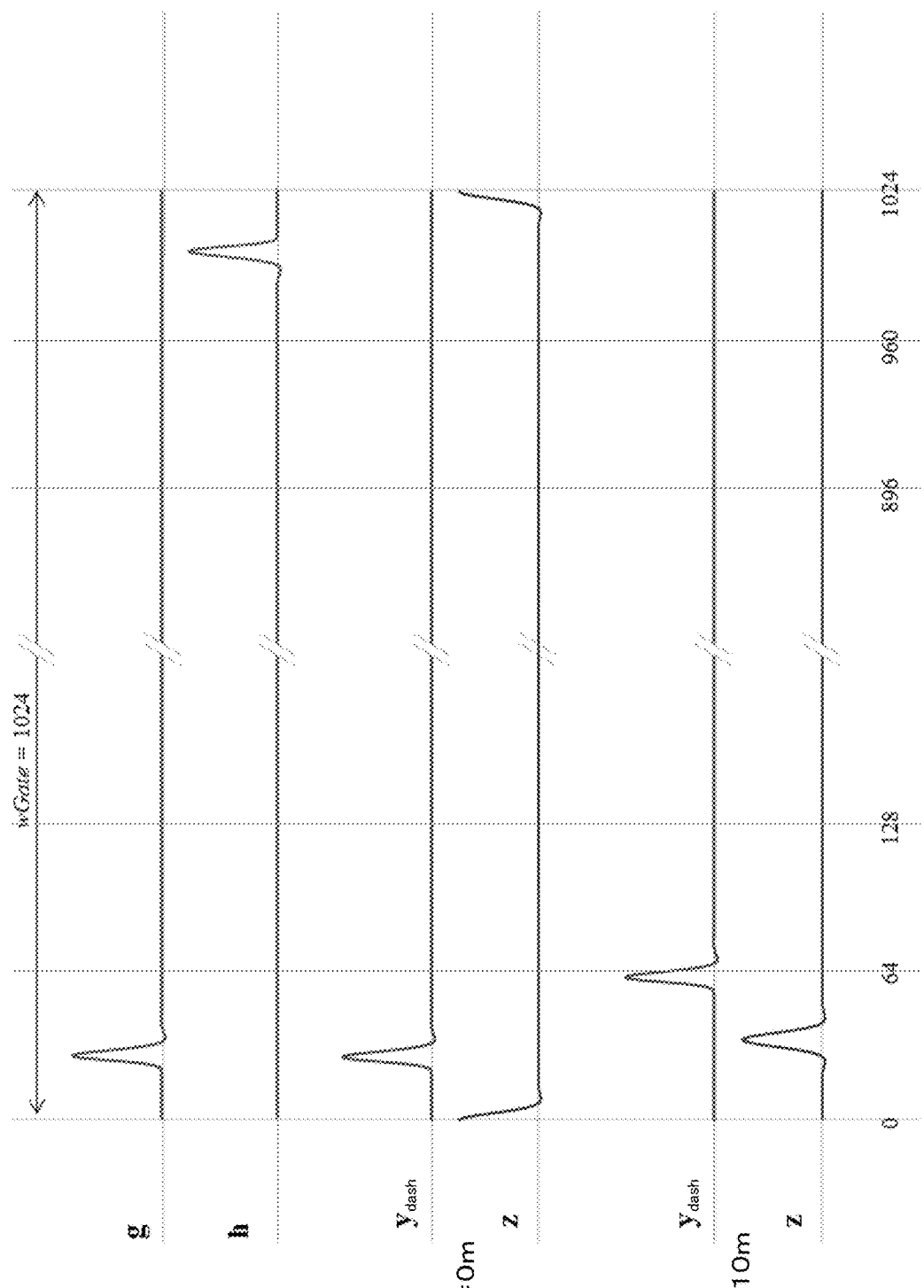
FIGS. 12A to 12C illustrate waveforms of reference receiving pulse and the impulse response during one segment period.

FIG. 12A illustrates a waveform of the reference receiving pulse g and the impulse response h during one segment period. As illustrated in FIG. 12A, according to the above equation, the reference receiving pulse g and the impulse response h have a time reversal relationship during a segment period. FIG. 12B illustrates a waveform of the corrected receiving segment $y_{dash}$ and the filtered segment z monitored at the time when a target object is placed at the scan origin point (R=0 m) and FIG. 12C illustrates a waveform of the corrected receiving segment $y_{dash}$ and the filtered segment z monitored at the time "R=10 m" is satisfied. The receiving filter 73 convolves the corrected receiving segment $y_{dash}$ with the impulse response h to thereby filter out noise from the corrected receiving segment $y_{dash}$ while adjusting the phase by the system delay $D_{SYS}$ (see FIG. 6C) as illustrated in FIGS. 12B and 12C.

It is noted that the circular convolution by the synchronization interference estimation unit 71 may be computed in the frequency domain by use of DFT. This leads to reduction of a great deal of computation. In this case, instead of the impulse response h being configurable through the W register, frequency response H, which is calculated in advance through the DFT operation on the impulse response h, may be configurable.

Figure 13:
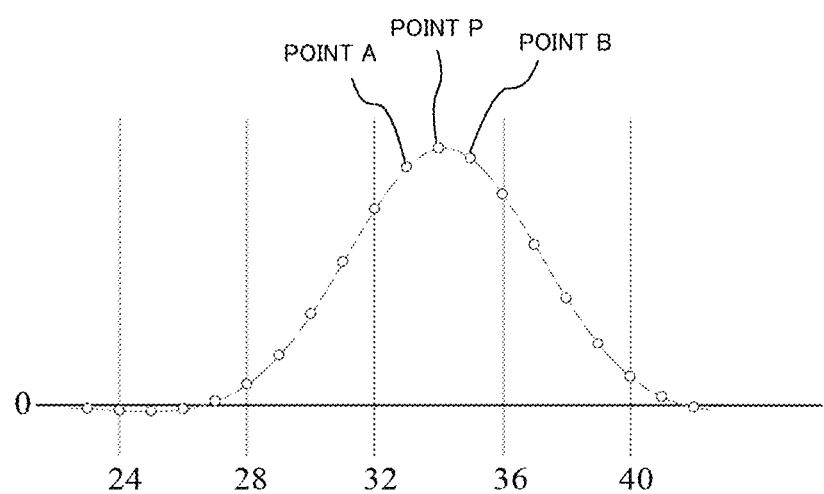
FIG. 13 illustrates an example of a filtered segment.

The peak detection unit 74 detects, with a sub-sample precision, the point (i.e., peak point) whose amplitude is the largest in the filtered segment and outputs the delay D and the amplitude A with respect to the peak point. FIG. 13 illustrates the filtered segment at the time when "R=0" is satisfied. The curve line indicates a continuous time waveform before the sampling and the circles indicate sample points. The peak detection unit 74 calculates the peak position in the continuous time waveform based on the sample points. According to the example illustrated in FIG. 13, the peak position in the filtered segment $\{z_k: k=0, 1, \ldots, wGate-1\}$ by the sample is "k=34". In contrast, the peak position in the continuous time waveform (i.e., peak position at the sub-sample precision) is expressed as follows.

$$D = R \cdot Fsmp/(c/2) = 34.157$$

The peak detection unit 74 estimates the delay D and the amplitude A with respect to the peak point specified at the sub-sample precision.

Various algorithms can be applied to the peak point detection process with the sub-sample precision. One example will be described below.

(first step) Calculating a sample point (point P in FIG. 13) with the largest amplitude.

(second step) Calculating a quadratic curve which passes three points, the point (point P) calculated at the first step and the points (point A and point B) next to the point P.

(third step) Calculating the delay D and the amplitude A with respect to the relative maximum point of the quadratic curve.

On the basis of the peak point information (delay D and amplitude A) outputted by the peak detection unit 74, the determination unit 75 determines whether or not there is an object at the detected point. This determination is made through comparison between the amplitude A of the peak point and the determination threshold "tDec". Concretely, when A>tDec is satisfied, the determination unit 75 determines "there is an object", thus outputting the peak point information. In contrast, when A<=tDec is satisfied, the determination unit 75 determines "there is no object", not outputting the peak point information.

The formatter 76 converts the peak point information associated with D and A outputted from the determination unit 75 and scan information (frame index frm and segment index seg) corresponding to the peak point into user (forward system) friendly formats. The formatter 76 according to the embodiment performs the following format conversion.

(1) It outputs the frame index frm as it is.

(2) It converts the segment index seg into the horizontal scan angle θ and outputs it.

(3) It converts the delay D into moving radius (distance) R (R=D(c/2)/Fsmp) and outputs it.

(4) It outputs the amplitude A as it is.

(5) It calculates the reflection rate U (U=A/Ψ(R)) based on the amplitude A and the moving radius R.

It is noted that the function "Ψ(R)" for calculating the reflection rate U is implemented as a reflection rate conversion table and can be configured by an external CPU. It is possible to estimate the reflection rate with little error by configuring the above table based on the expected value of the peak amplitude acquired from Lambert diffusing material with 100% reflection rate which is placed at position of the moving radius R.

As described above, the LIDAR 1 according to the first embodiment includes: the scanner 55 that emits outgoing light Lo in response to the pulse trigger signal PT while changing the outgoing direction thereof; the absorption member 7 provided in the outgoing direction and absorbing the outgoing light Lo; the APD 41 to receive the return light Lr of the outgoing light Lo; and the DSP 16. The DSP 16 includes the synchronization interference estimation unit 71 to calculate, on the basis of the output signal of the APD 41 at the time when the outgoing light Lo is directed to the absorption member 7, the synchronization interference estimate w that is a noise signal generated due to the pulse trigger signal PT and the like. Thereby, the LIDAR 1 can suitably suppress the deterioration of the object detection performance and the ranging performance due to the synchronization interference.

<Second Embodiment>

Next, a description will be given of the second embodiment. The LIDAR 1 according to the second embodiment includes a reflection member instead of the absorption member 7. Then, the DSP 16 estimates the reference receiving pulse g by averaging the receiving segment y corresponding to the return light Lr which reflected by the reflection member. Hereinafter, the same reference numbers as the first embodiment are allocated to the same elements as the first embodiment and the explanation thereof will be omitted.

First, a description will be given of the effect of estimating the reference receiving pulse g. In such a case that preliminarily measured reference receiving pulse g stored on the W register is used, unfortunately, the error due to the aging degradation and/or individual specificity have a bad influence on the object detection performance and the ranging performance. Specifically, when the measurement of the reference receiving pulse g is conducted at the development process of the LIDAR 1, unfortunately, it is impossible to cope with the individual specificity of the transmission pulse shape and the time delay of the LD 35 and the individual specificity relating to the receiver 40. In contrast, when the measurement of the reference receiving pulse g is conducted at the production process of the LIDAR 1, unfortunately, it is impossible to cope with the aging change of the transmission pulse shape and other changes due to the peripheral environment such as humidity. In response to the above issues, the DSP 16 estimates the reference receiving pulse g compatible with the present state of the LIDAR 1 and the peripheral environment to thereby suitably suppress the deterioration of the object detection performance and the ranging performance.

Figure 14A:
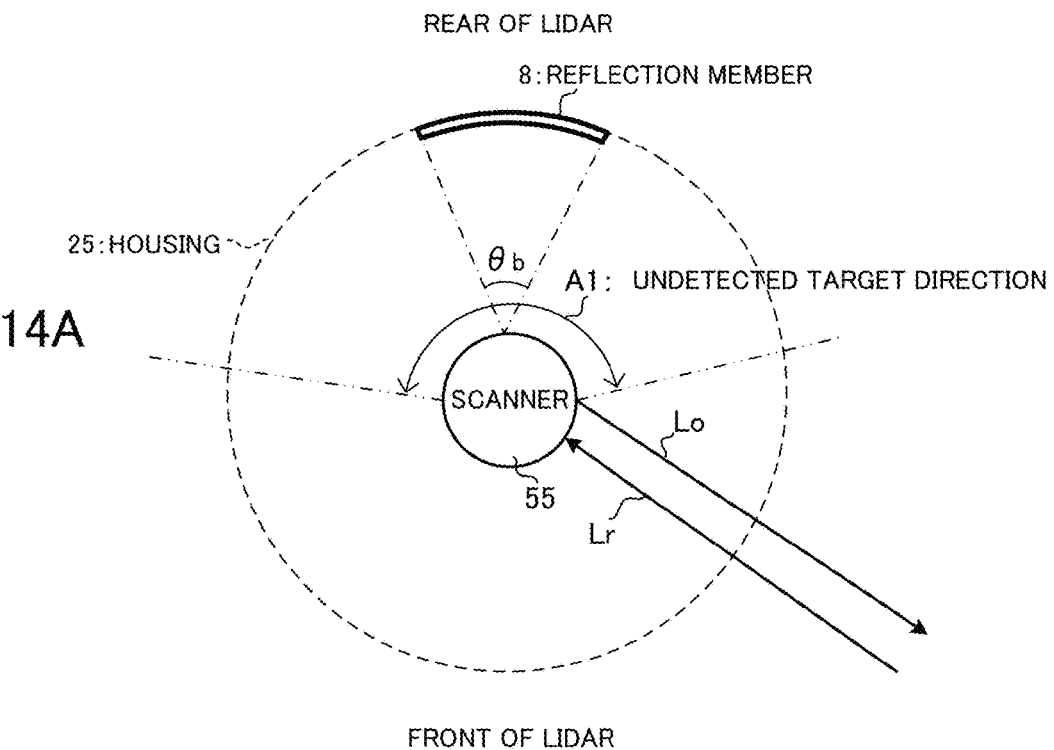
FIGS. 14A and 14B illustrate the arrangement of a reflection member.

FIG. 14A schematically illustrates the arrangement of the reflection member 8. As illustrated in FIG. 14A, the reflection member 8 is arranged at or near the cylindrical housing 25 of the LIDAR 1 which houses the scanner 55 and the like. It is noted that the reflection member 8 is provided on the undetected target direction (see arrow A1) that is the direction, which is extracted from the 360-degree irradiation direction of the outgoing light Lo by the scan of the scanner 55, other than the target direction of detection of an object by the LIDAR 1. According to the example illustrated in FIG. 14A, the reflection member 8 is placed on the wall surface of the housing 25 in the rear of the LIDAR 1, wherein the wall surface is irradiated with the outgoing light Lo corresponding to an angle range "θb" (e.g., 60 degree). In this case, for example, the reflection member 8 is provided on the inside surface of a transparent cover of the housing 25 which the outgoing light Lo and the return light Lr passthrough. In another example, the reflection member 8 may be a portion of the above transparent cover of the housing 25 processed to reflect the outgoing light Lo. Hereinafter, a time period, extracted from a period (i.e., one frame period) of the one time around of the scan by the scanner 55, in which the APD 41 receives the outgoing light Lo reflected by the reflection member 8 is referred to as "reflection suppression period Ttag2". The reference reflective period Ttag2 includes multiple segment periods corresponding to scan angles at which the outgoing light Lo is incident on the reflection member 8. Information (e.g., segment index) associated with the above scan angles at which the outgoing light Lo is incident on the reflection member 8 is stored on the W register in advance so that the DSP 16 can refer to the information.

Figure 14B:
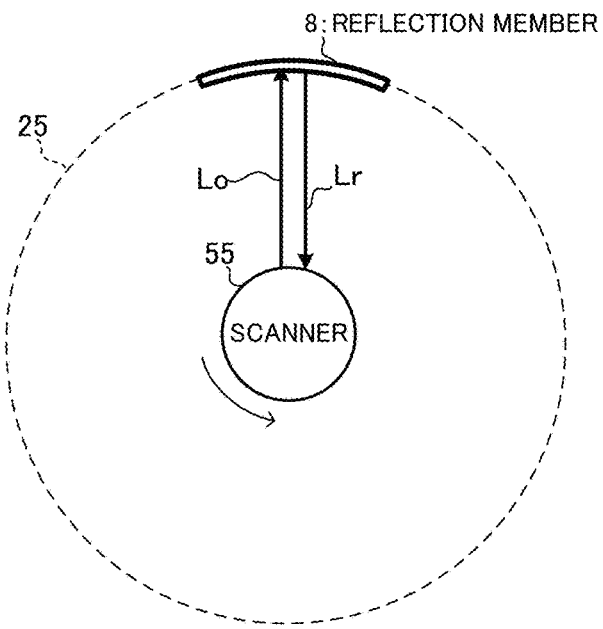

FIG. 14B illustrates a state that the outgoing light Lo is emitted towards the direction in which the reflection member 8 is arranged according to the example illustrated in FIG. 14A. When the outgoing light Lo is incident on the reflection member 8, the reflection member 8 reflects the outgoing light Lo as the return light Lr with a particular reflection rate to thereby lead the return light Lr to the scanner 55. In this case, the reflection rate of the reflection member 8 is within such a range of the reflection rate that the level of the analog voltage signal inputted to the ADC 20 at the time when the return light Lr reflected at the reflection member 8 is incident on the APD 41 is within the input dynamic range of the ADC 20 (i.e., not too small compared to the noise and does not go into the saturation state). In other words, the reflection rate of the reflection member 8 is determined to such a reflection rate that the signal inputted to the ADC 20 at the time when the APD 41 receives the return light Lr reflected at the reflection member 8 is distinguishable from the noise and does not become the saturation state. With the reflection member 8 having such a reflection rate, the DSP 16 can correctly estimate the reference receiving pulse g.

Figure 15:
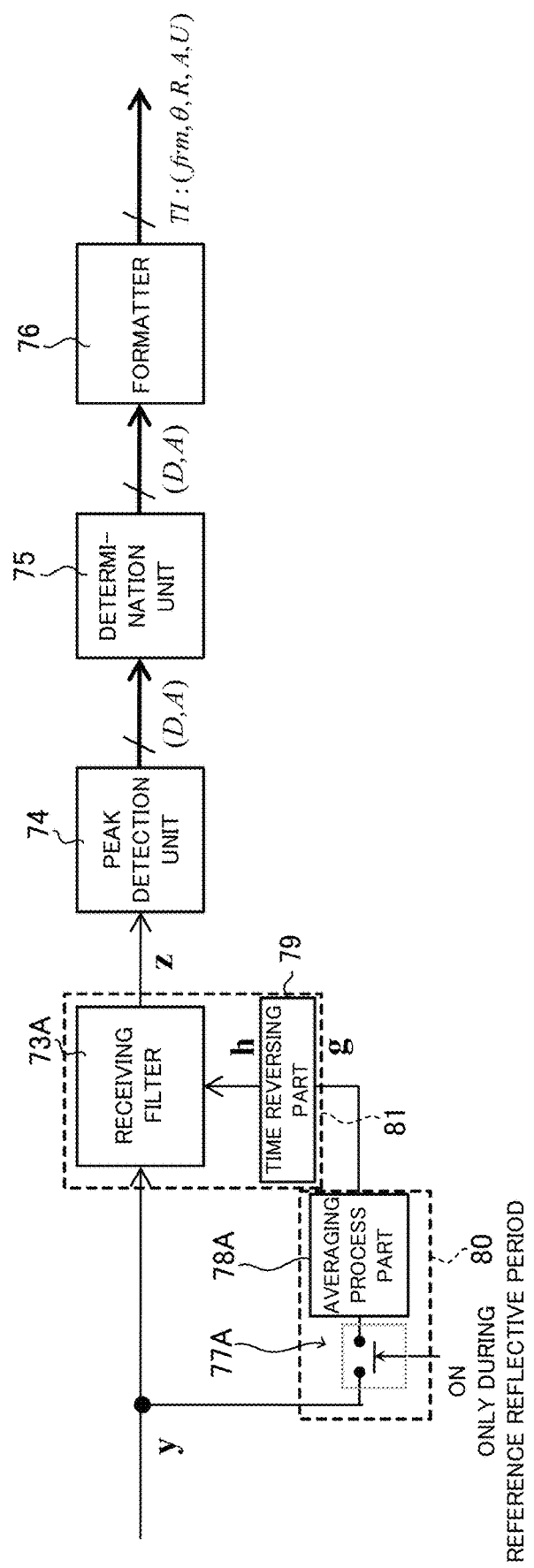
FIG. 15 illustrates a block diagram of the signal processing executed by the DSP according to the second embodiment.

FIG. 15 illustrates a block diagram of the signal processing executed by the DSP 16 according to the second embodiment. As illustrated in FIG. 15, the DSP 16 according to the second embodiment includes a reference receiving pulse estimation unit 80, a matched filter 81, a peak detection unit 74, a determination unit 75 and a formatter 76. The DSP 16 sequentially read out the receiving segment y from the receiving segment memory 15 and processes it.

The reference receiving pulse estimation unit 80 averages the receiving segment y generated during the reference reflective period Ttag2 and supplies the averaged receiving segment y as the reference receiving pulse g to the matched filter 81. The reference receiving pulse estimation unit 80 includes a switch 77A and an averaging process part 78A.

The switch 77A is a switch controlled to be the on-state only during the reference reflective period Ttag2 and supplies the receiving segment y generated during the reflection suppression period Ttag1 to the averaging process part 78A. It is noted that the switch 77A does not have to be the on-state during the whole reference reflective period Ttag2. Instead, the switch 77A may be controlled to be the on-state during a part of the reference reflective period Ttag2.

The averaging process part 78A averages the receiving segment y supplied during a period when the switch 77A is on-state to supply the matched filter 81 with the averaged receiving segment y as the estimated reference receiving pulse g. In this case, for example, the averaging process part 78A accumulates the receiving segment y sequentially provided from the switch 77A during one frame period and calculates the reference receiving pulse g that is the averaged receiving segment y calculated by dividing the accumulated receiving segment y by the number of the accumulated receiving segment y. In another example, the averaging process part 78A calculates the reference receiving pulse g by averaging the averaged receiving segment y, that is an average of the receiving segment y during one frame period, through an IIR filter in the frame direction (i.e., among different frame indexes).

The matched filter 81 includes a receiving filter 73A and a time reversing part 79. The time reversing part 79 generates the impulse response h from the reference receiving pulse g on the basis of the above relational equation A. In this case, the reference receiving pulse g and the impulse response h have a time reversal relationship during a segment period as illustrated in FIG. 12A. The receiving filter 73A calculates the filtered segment z by convolving the receiving segment y with the impulse response h which the time reversing part 79 outputs.

In this case, the impulse response h to be supplied to the receiving filter 73A is generated from the reference receiving pulse g in accordance with the present state of the LIDAR 1 and peripheral environment. The receiving filter 73A can supply the filtered segment z, which is accurately corrected in consideration of the noise and the time delay, to the peak detection unit 74 even if there are an aging change in the shape of the transmission pulse and/or other changes due to the peripheral environment such as temperature.

The peak detection unit 74 detects the peak point having the largest amplitude in the filtered segment z and outputs the delay D and the amplitude A with respect to the peak point. The determination unit 75 selects only such a point that the amplitude A is larger than the threshold tDet and sends them to the formatter 76. The formatter 76 converts the delay D, the amplitude A, the frame index frm and the segment index seg into appropriate formats to supply it as the target information TI to the system CPU 5.

As described above, the LIDAR 1 according to the second embodiment includes: the scanner 55 that emits outgoing light Lo in response to the pulse trigger signal PT while changing the outgoing direction thereof; the reflection member 8 provided in the outgoing direction and reflecting the outgoing light Lo; the APD 41 to receive the return light Lr that is the outgoing light Lo reflected at an object; and the DSP 16. The DSP 16 includes the reference receiving pulse estimation unit 80 to estimate, on the basis of the output signal of the APD 41 at the time when the APD 41 receives the return light Lr returned by the reflection member 8, the reference receiving pulse g to be used by the matched filter 81. Thereby, the LIDAR 1 suitably estimates the reference receiving pulse g which is compatible with the aging change in the shape of the transmission pulse and other changes in the peripheral environment such as temperature to thereby achieve a high SNR.

<Third Embodiment>

Next, a description will be given of the third embodiment. The DSP 16 according to the third embodiment performs the both of the calculation process of the synchronization interference estimate w according to the first embodiment and the calculation process of the reference receiving pulse g according to the second embodiment. In this case, on the assumption that the reflection rate at the absorption member 7 is not an ideal value (i.e., substantially 0%), the DSP 16 performs the process to omit the influence due to the return light Lr reflected by the absorption member 7. Thereby, the DSP 16 correctly estimates the synchronization interference estimate w and the reference receiving pulse g even if there occurs the return light Lr from the absorption member 7 which affects the receiving segment y.

Figure 16A:
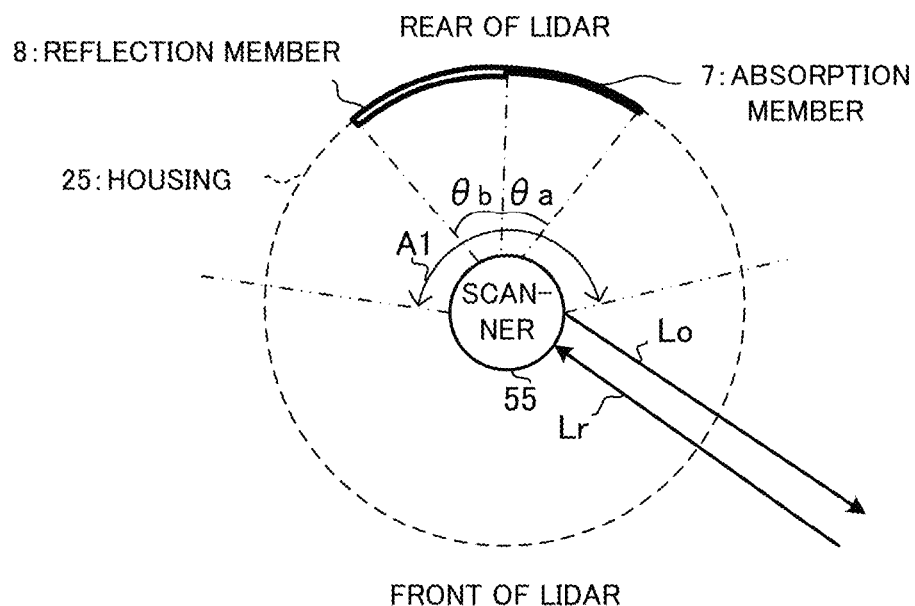
FIGS. 16A and 16B schematically illustrate the arrangement of an absorption member and a reflection member.

First, a description will be given of the arrangement of the absorption member 7 and the reflection member 8. FIG. 16A schematically illustrates the arrangement of the absorption member 7 and the reflection member 8.

In FIG. 16A, the absorption member 7 and the reflection member 8 are arranged at or near a cylindrical housing 25 of the LIDAR 1. In this case, the distance between the scanner 55 and the absorption member 7 is substantially equal to the distance between the scanner 55 and the reflection member 8. Additionally, as with the first embodiment and the second embodiment, the absorption member 7 and the reflection member 8 are provided on the undetected target direction (see arrow A1) that is the direction, which is extracted from the 360-degree irradiation direction of the outgoing light Lo by the scan of the scanner 55, other than the target direction of detection of an object by the LIDAR 1. Although the absorption member 7 and the reflection member 8 are arranged to adjacent to each other according to FIG. 16A, they may be provided instead to be apart from each other by a predetermined length.

Figure 16B:
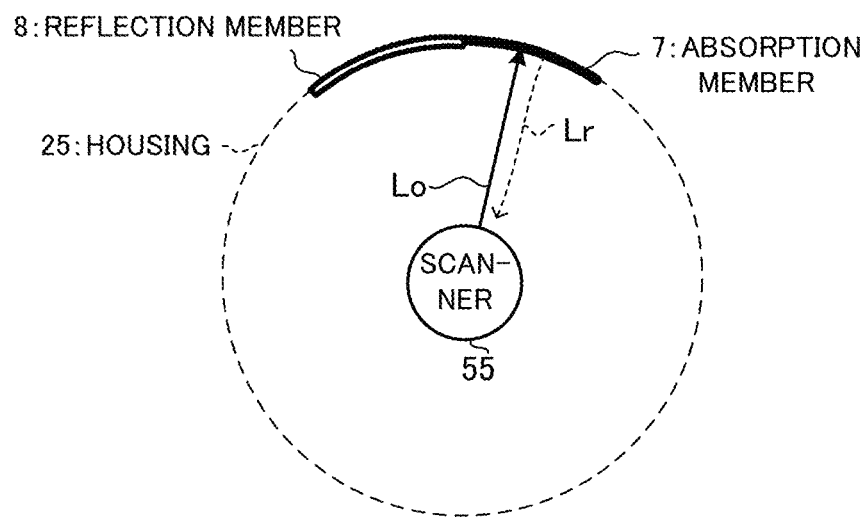

Next, a description will be given of the influence due to the return light Lr reflected by the absorption member 7. FIG. 16B illustrates a state that the outgoing light Lo is emitted towards the direction in which the absorption member 7 is arranged according to the example illustrated in FIG. 16A.

In the case of FIG. 16B, ideally, the reflection rate of the absorption member 7 should be substantially 0 and the intensity of the return light Lr which the APD 41 receives is desirable to be substantially 0. However, in fact, it is unfeasible to provide the absorption member 7 which has such a reflection rate. Even if there is provided the absorption member 7 with such a reflection rate, the reflection rate of the absorption member 7 could become apart from the ideal value in stages due to the aging change therein. In this case, unfortunately, the return light Lr form the absorption member 7 with an unignorable amount of light is incident on the scanner 55, affecting the receiving segment y.

Figure 17A:
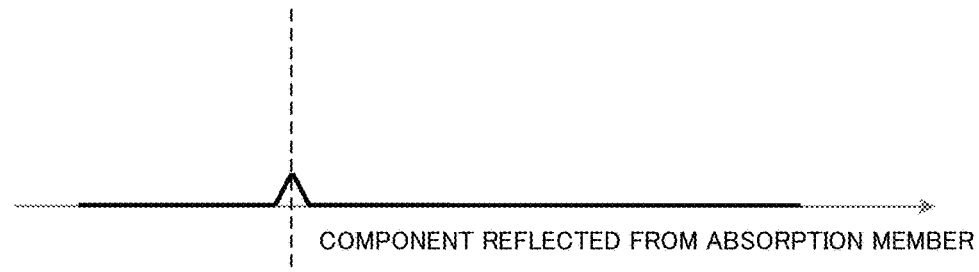
FIGS. 17A to 17C illustrate a component of the receiving segment reflected from the absorption member, a component of the synchronization interference and a component reflected by the reflection member, respectively.
Figure 17B:
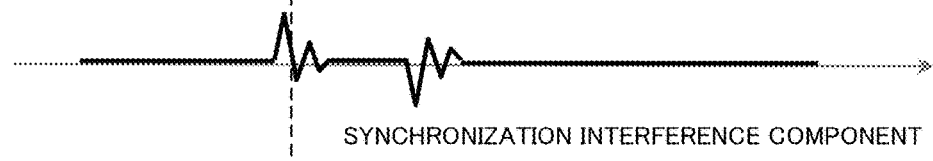
Figure 17C:
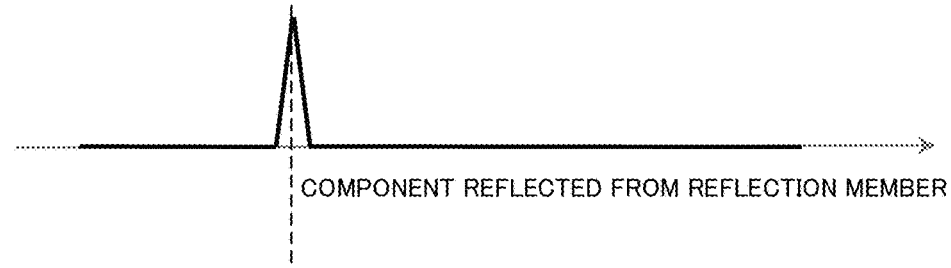

FIGS. 17A to 17C illustrate a component reflected by the absorption member 7 and overlapped with the receiving segment y, a component of the synchronization interference and a component reflected by the reflection member 8, respectively. For the reflection suppression period Ttag1, the waveform of the receiving segment y corresponds to the sum of the component reflected by the absorption member 7 illustrated in FIG. 17A and the component of the synchronization interference illustrated in FIG. 17B when the random noise is not considered. According to the calculation approach of the synchronization interference estimate w by the synchronization interference estimation unit 71 explained in the first embodiment, since the synchronization interference estimate w includes not only the component of the synchronization interference illustrated in FIG. 17B but also the component reflected by the absorption member 7 illustrated in FIG. 17A, the estimation of the component of the synchronization interference cannot be estimated correctly.

In contrast, the absorption member 7 and the reflection member 8 are arranged so that their distances to the scanner 55 are substantially equivalent. Thus, as illustrated in FIGS. 17A and 17C, the peak position of the component reflected by the absorption member 7 is almost the same as the peak position of the component reflected by the reflection member 8. In response to the above issues, as described later, the DSP 16 generates a replica (duplicate) of the component reflected by the absorption member 7 illustrated in FIG. 17A by calculating the correlation between the receiving segment y (i.e., synchronization interference estimate w overlapped with the component reflected by the absorption member 7) obtained during the reflection suppression period Ttag1 and the component reflected by the reflection member 8 illustrated in FIG. 17C. Then, the DSP 16 subtracts the replica of the component reflected by the absorption member 7 from the synchronization interference estimate overlapped with the reflective component, thereby suitably estimating the synchronization interference.

Figure 18:
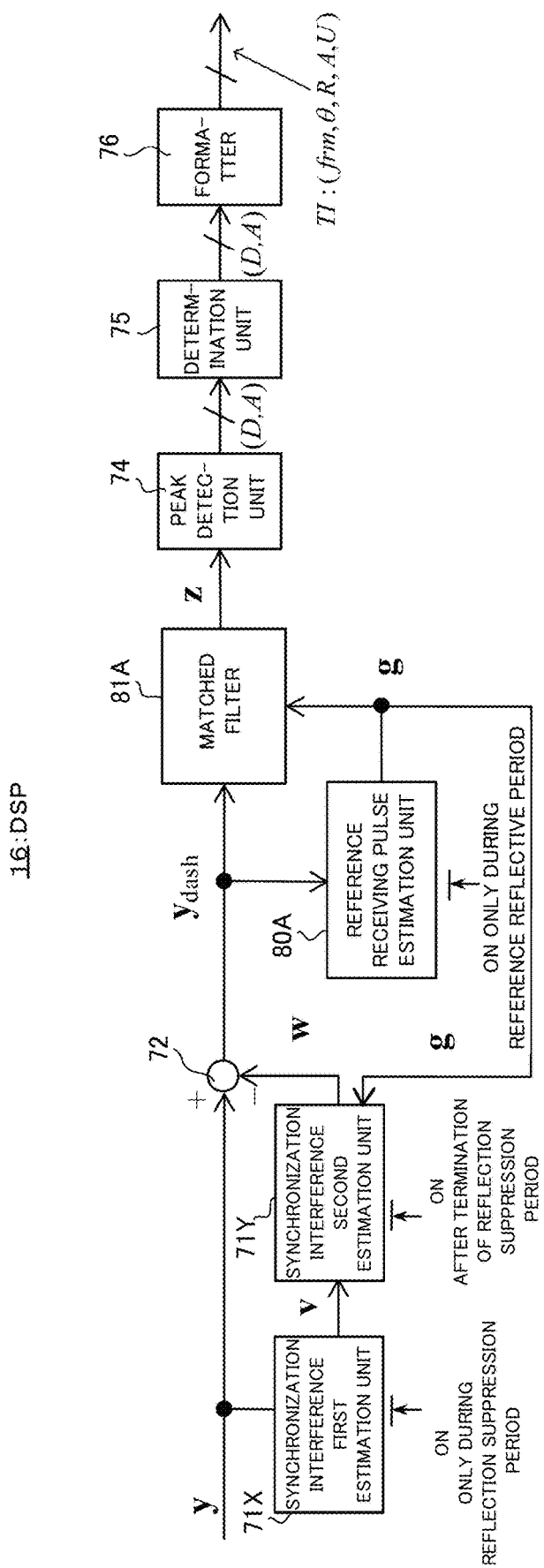
FIG. 18 illustrates a block diagram of the signal processing executed by the DSP according to the third embodiment.

FIG. 18 illustrates a block diagram of the signal processing executed by the DSP 16 according to the third embodiment. As illustrated in FIG. 18, the DSP 16 according to the third embodiment includes a synchronization interference first estimation unit 71X, a synchronization interference second estimation unit 71Y, a subtractor 72, a reference receiving pulse estimation unit 80A, a matched filter 81A, a peak detection unit 74, a determination unit 75 and a formatter 76. The DSP 16 sequentially read out the receiving segment y from the receiving segment memory 15 and processes it.

By executing a process as with the synchronization interference estimation unit 71 according to the first embodiment, the synchronization interference first estimation unit 71X generates, from the receiving segment y obtained during the reflection suppression period Ttag1, uncorrected synchronization interference estimate "v" which corresponds to the synchronization interference estimate w according to the first embodiment. Specifically, the synchronization interference first estimation unit 71X has a switch controlled to be the on-state only during the reflection suppression period Ttag1 thereby to extract the receiving segment y during the reflection suppression period Ttag1. Then, as with the averaging process part 78 according to the first embodiment, the synchronization interference first estimation unit 71X averages the extracted receiving segment y during the reflection suppression period Ttag1 to thereby generate the uncorrected synchronization interference estimate v that is a real vector with the vector length wGtate.

At the end of the reflection suppression period Ttag1, on the basis of the reference receiving pulse g estimated by the reference receiving pulse estimation unit 80A and the uncorrected synchronization interference estimate v calculated by the synchronization interference first estimation unit 71X, the synchronization interference second estimation unit 71Y calculates the synchronization interference estimate w that the component reflected by the absorption member 7 illustrated in FIG. 17A is omitted from the uncorrected synchronization interference estimate v. A specific example of the block configuration of the synchronization interference second estimation unit 71Y will described later. It is noted that during a period before the synchronization interference second estimation unit 71Y calculates the synchronization interference estimate w, the synchronization interference second estimation unit 71Y supplies the uncorrected synchronization interference estimate v as the synchronization interference estimate w to the subtractor 72. The synchronization interference second estimation unit 71Y is an example of the "noise estimation unit" according to the present invention.

The subtractor 72, as with the first embodiment, subtracts the synchronization interference estimate w from the receiving segment y to supply the reference receiving pulse estimation unit 80A and matched filter 81A with the corrected receiving segment $y_{dash}$, respectively. In this case, the component of the synchronization interference illustrated in FIG. 17B is subtracted from the corrected receiving segment $y_{dash}$ by the subtractor 72. For such a duration that the uncorrected synchronization interference estimate v with the component reflected by the absorption member 7 illustrated in FIG. 17A is inputted to the subtractor 72 as the synchronization interference estimate w, the subtractor 72, as described later, subtracts not only the component of the synchronization interference illustrated in FIG. 17B but also the component reflected by the absorption member 7 illustrated in FIG. 17A. As a result, the component reflected by the absorption member 7 illustrated in FIG. 17A is redundantly (unnecessarily) subtracted from the corrected receiving segment $y_{dash}$.

The reference receiving pulse estimation unit 80A estimates the reference receiving pulse g by processing the corrected receiving segment $y_{dash}$ as with the reference receiving pulse estimation unit 80 according to the second embodiment. Specifically, the reference receiving pulse estimation unit 80A includes elements corresponding to the switch 77A and the averaging process part 78A according to the second embodiment and extracts and averages the corrected receiving segment $y_{dash}$ generated during the reference reflective period Ttag2. Then, the reference receiving pulse estimation unit 80A determines the averaged corrected receiving segment $y_{dash}$ as an estimate of the reference receiving pulse g. The reference receiving pulse estimation unit 80A supplies the estimated reference receiving pulse g to the synchronization interference second estimation unit 71Y and the matched filter 81A, respectively.

The synchronization interference first estimation unit 71X, the synchronization interference second estimation unit 71Y and the reference receiving pulse estimation unit 80A constitute an example of the "estimation unit" according to the present invention.

It is noted that the component reflected by the absorption member 7 illustrated in FIG. 17A is redundantly subtracted from the corrected receiving segment $y_{dash}$ supplied to the reference receiving pulse estimation unit 80A during a period when the uncorrected synchronization interference estimate v is inputted to the subtractor 72 as the synchronization interference estimate w. Thus, during the above period, the reference receiving pulse estimation unit 80A supplies the synchronization interference second estimation unit 71Y with the reference receiving pulse g from which the component reflected by the absorption member 7 illustrated in FIG. 17A is unnecessarily subtracted.

The matched filter 81A processes the corrected receiving segment $y_{dash}$ as with the matched filter 81 according to the second embodiment to thereby generate the filtered segment z and supply it to the peak detection unit 74. Specifically, the matched filter 81A includes elements corresponding to the receiving filter 73A and the time reversing part 79 according to the second embodiment and generates the impulse response h from the reference receiving pulse g on the basis of the above relational equation A. Thereafter, the matched filter 81A calculates the filtered segment z by convolving the corrected receiving segment $y_{dash}$ with the impulse response h.

The peak detection unit 74 detects the peak point which has the largest amplitude in the filtered segment z and outputs the delay D and the amplitude A with respect to the peak point. The determination unit 75 selects only such a point that the amplitude A is larger than the threshold tDet and sends them to the formatter 76. The formatter 76 converts the delay D, the amplitude A, the frame index frm and the segment index seg into appropriate formats to supply it as the target information TI to the system CPU 5.

Figure 19:
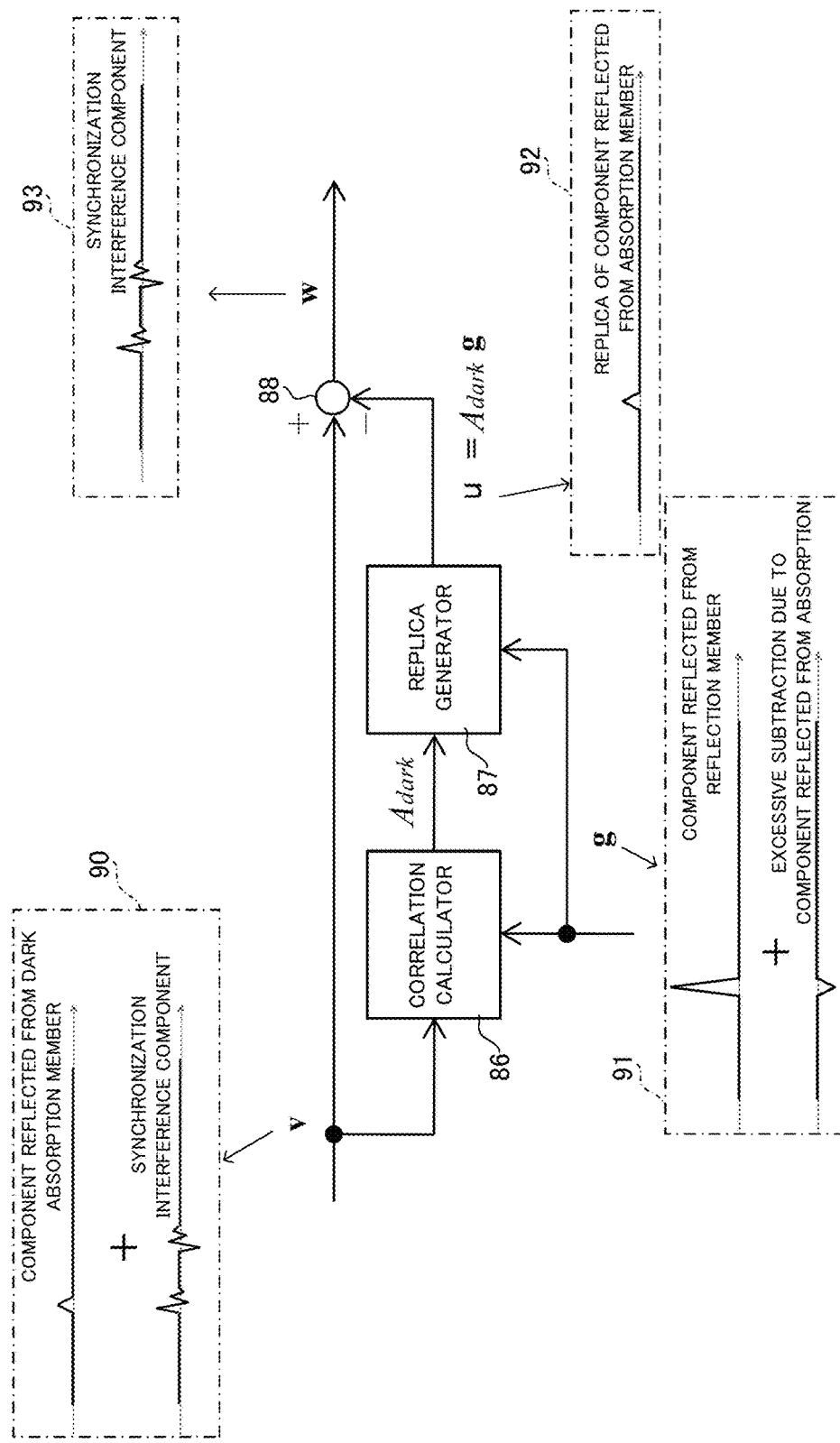
FIG. 19 illustrates a block diagram of the signal processing executed by a synchronization interference second estimation unit.

FIG. 19 illustrates a block diagram of the signal processing executed by the synchronization interference second estimation unit 71Y. As illustrated in FIG. 19, the synchronization interference second estimation unit 71Y includes a correlation calculator 86, a replica generator 87 and a subtractor 88. FIG. 19 also indicates each output/input waveform during a period when the uncorrected synchronization interference estimate v is inputted to the subtractor 72 as the synchronization interference estimate w within the frames 90 to 93 formed by alternate long and short dash lines.

The correlation calculator 86 calculates the correlation between the uncorrected synchronization interference estimate v supplied from the synchronization interference first estimation unit 71X and the reference receiving pulse g supplied from the reference receiving pulse estimation unit 80A to calculate an amplitude estimate value "$A_{dark}$" that is an estimate value of the amplitude of peak position of the component (see FIG. 17A) reflected by the absorption member 7. Concretely, the correlation calculator 86 calculates the amplitude estimate value $A_{dark}$ according to the following equation, by calculating the scalar product (inner product) of the uncorrected synchronization interference estimate v that is a real vector with the vector length wGate (1024 in this case) and the normalized reference receiving pulse g.

$$A_{dark} = \frac{1}{\|g\|} \sum_{k=0}^{k<wGate} v_k g_k$$

$$\|g\| = \sum_{k=0}^{k<wGate} |g_k|^2$$

Hereinafter, a description will be given of the validity of the calculation of the amplitude estimate value $A_{dark}$ based on the above equation. The reference receiving pulse g is supplied from the reference receiving pulse estimation unit 80A to the correlation calculator 86 in such a state that the component reflected by the absorption member 7 illustrated in FIG. 17A is unnecessarily subtracted from the reflection member 8. Thus, in this case, as illustrated in the frame 91 formed by alternate long and short dash lines, the reference receiving pulse g is equivalent to the sum of the component reflected by the reflection member 8 illustrated in FIG. 17C and the excessive subtraction due to the component reflected by the absorption member 7. The uncorrected synchronization interference estimate v supplied to the correlation calculator 86 is, as illustrated in the frame 90 formed by alternate long and short dash lines, equivalent to the sum of the component reflected by the absorption member 7 illustrated in FIG. 17A and the component of the synchronization interference illustrated in FIG. 17B. In this case, the peak position of the component reflected by the reflection member 8 substantially coincides with the peak position of the excessive subtraction due to the component reflected by the absorption member 7 and the peak position of the reference receiving pulse g corresponding to the sum thereof also substantially coincides with the peak position of the component reflected by the absorption member 7. Thus, by calculating the correlation between the reference receiving pulse g and the uncorrected synchronization interference estimate v according to the above equation, the correlation calculator 86 can accurately estimate the amplitude of the peak position of the component reflected by the absorption member 7 illustrated in FIG. 17A. Regarding the above calculation equation of the amplitude estimate value $A_{dark}$, in order to avoid doing a root calculation and doing division by the size (length) of the reference receiving pulse g at the time of calculating the replica u, the scalar product of the uncorrected synchronization interference estimate v and the reference receiving pulse g is divided by the square of the size of the reference receiving pulse g.

On the basis of the amplitude estimate value $A_{dark}$ outputted by the correlation calculator 86 and the reference receiving pulse g, the replica generator 87 generates a replica "u" of the component reflected by the absorption member 7 illustrated in FIG. 17A. The replica u is a real vector with the vector length equal to the gate width wGate. Considering that the peak position of the reference receiving pulse g substantially coincides with the peak position of the component reflected by the absorption member 7 illustrated in FIG. 17A, the replica generator 87 generates such a replica u as indicated by the following equation that the peak position of the replica u coincides with the peak position of the reference receiving pulse g and the amplitude of the replica u at the peak position is equivalent to the amplitude estimate value $A_{dark}$.

$$u = A_{dark}$$

Thereby, as illustrated in the frame 92 formed by alternate long and short dash lines, the replica generator 87 can suitably generate the replica of the component reflected by the absorption member 7 illustrated in FIG. 17A.

The subtractor 88 subtracts the replica u generated by the replica generator 87 from the uncorrected synchronization interference estimate v. In this case, as illustrated in the frame 93 formed by alternate long and short dash lines, the synchronization interference estimate w is equivalent to the uncorrected synchronization interference estimate v from which the component reflected by the absorption member 7 illustrated in FIG. 17A is suitably omitted. Thereafter, the synchronization interference estimate w is supplied to the subtractor 72 and the subtractor 72 generates the corrected receiving segment $y_{dash}$, that is the receiving segment y from which the synchronization interference estimate w is subtracted, thus supplying it to the reference receiving pulse estimation unit 80A and the matched filter 81A. In this case, the reference receiving pulse estimation unit 80A generates the reference receiving pulse g (see FIG. 17C) which does not include the influence of the component reflected by the absorption member 7 illustrated in FIG. 17A. The matched filter 81A filters the corrected receiving segment $y_{dash}$ which does not include the component of the synchronization interference, based on the reference receiving pulse g which does not include the influence of the component reflected by the absorption member 7. Thereby, the matched filter 81A supplies the peak detection unit 74 with the filtered segment z which is accurately corrected to remove the noise and the time delay.

A supplemental explanation will be given of the effect of the block configuration of the DSP 16 illustrated in FIG. 18 in which the synchronization interference second estimation unit 71Y is provided. Supposing that the synchronization interference second estimation unit 71Y is not provided in the configuration (i.e., supposing that the synchronization interference estimation unit 71 and the reference receiving pulse estimation unit 80 are simply arranged in the configuration), the synchronization interference estimate w calculated during the reflection suppression period Ttag1 includes not only the component of the synchronization interference illustrated in FIG. 17B but also the component reflected by the absorption member 7 illustrated in FIG. 17A. In this case, even during the period when the LIDAR 1 scans towards the target direction of the detection, the corrected receiving segment $y_{dash}$ is generated based on the synchronization interference estimate w with the component reflected by the absorption member 7, thus causing errors of the estimates of the reflection rate and the distance calculated by the corrected receiving segment $y_{dash}$. Furthermore, as illustrated in the frame 91 formed by alternate long and short dash lines in FIG. 19, the reference receiving pulse g calculated during the reference reflective period Ttag2 includes the excessive subtraction due to the component reflected by the absorption member 7, thus causing the estimate accuracy of the reference receiving pulse g to deteriorate. In response to the above issues, the DSP 16 according to the third embodiment includes the synchronization interference second estimation unit 71Y to omit the component reflected by the absorption member 7 from the synchronization interference estimate w, thereby suitably suppressing the occurrences of the error due to the component reflected by the absorption member 7.

As described above, the LIDAR 1 according to the third embodiment includes: the scanner 55 that emits the outgoing light Lo while changing the outgoing direction thereof; the reflection member 8 that is arranged in a first outgoing direction and reflects the outgoing light Lo; the absorption member 7 that is arranged in a second outgoing direction and absorbs the outgoing light Lo; the APD 41 that receives return light Lr; and the DSP 16. The DSP 16 generates replica u representing a component reflected by the absorption member 7 on the basis of output signals of the APD 41 obtained at each time when the outgoing light Lo is emitted in the first outgoing direction and in the second outgoing direction. Thereby, the LIDAR 1 can estimate the synchronization interference estimate w by omitting the replica u from the uncorrected synchronization interference estimate v to thereby suppress the occurrences of the error due to the component reflected by the absorption member 7.

BRIEF DESCRIPTION OF REFERENCE NUMBERS

1 LIDAR
5 System CPU
7 Absorption member
8 Reflection member
19 ASIC
30 Transmitter
40 Receiver
50 Scan optical component

The invention claimed is:
1. An information processing device which processes an output signal of a light receiving unit of an optical apparatus, the optical apparatus comprising:
an emitting unit to emit laser light, based on a first signal, while changing an outgoing direction of the laser light;
a reflection member arranged in a first outgoing direction, the reflection member reflecting the laser light;
an absorption member arranged in a second outgoing direction, the absorption member absorbing the laser light; and
the light receiving unit to receive return light of the laser light, the information processing device comprising:
an estimation unit to estimate, on a basis of the output signal generated at a time when the outgoing direction of the laser light is the first outgoing direction and the output signal generated at a time when the outgoing direction of the laser light is the second outgoing direction, a signal regarding the return light which is reflected by the absorption member, wherein the estimation unit includes a noise estimation unit, the noise estimation unit estimating a noise signal generated due to the first signal.

2. The information processing device according to claim 1, wherein the noise signal is generated due to the first signal by subtracting the signal estimated by the estimation unit from the output signal generated at the time when the outgoing direction of the laser light is the second outgoing direction.

3. The information processing device according to claim 1, wherein the estimation unit estimates the signal regarding the return light which is reflected by the absorption member by estimating an amplitude of a component which correlates with the output signal generated at the time when the outgoing direction of the laser light is the first outgoing direction, the component being extracted from the output signal generated at the time when the outgoing direction of the laser light is the second outgoing direction.

4. The information processing device according to claim 3, wherein the output signal is converted into a real vector with a common vector length with respect to each emitting angle of the laser light, and wherein the estimation unit estimates the amplitude based on a scalar product of the output signal generated at the time when the outgoing direction of the laser light is the first outgoing direction and the output signal generated at the time when the outgoing direction of the laser light is the second outgoing direction.

5. The information processing device according to claim 3, wherein the estimation unit calculates an estimate signal as the signal regarding the return light which is reflected by the absorption member, a peak position of the estimate signal coinciding with a peak position of the output signal generated at the time when the outgoing direction of the laser light is the second outgoing direction, the amplitude of the estimate signal at the peak position being equal to the estimated amplitude.

6. A control method executed by an optical apparatus, the optical apparatus comprising:

an emitting unit to emit laser light, based on a first signal, while changing an outgoing direction of the laser light;

a reflection member arranged in a first outgoing direction, the reflection member reflecting the laser light;

an absorption member arranged in a second outgoing direction, the absorption member absorbing the laser light; and a light receiving unit to receive return light of the laser light, the control method comprising:

estimating, on a basis of an output signal generated at a time when the outgoing direction of the laser light is the first outgoing direction and the output signal generated at a time when the outgoing direction of the laser light is the second outgoing direction, a signal regarding the return light which is reflected by the absorption member, wherein, in the estimating, a noise estimation unit estimates a noise signal generated due to the first signal.

7. A non-transitory computer readable medium including instructions executed by a computer which processes an output signal of a light receiving unit of an optical apparatus, the optical apparatus comprising:

an emitting unit to emit laser light, based on a first signal, while changing an outgoing direction of the laser light;

a reflection member arranged in a first outgoing direction, the reflection member reflecting the laser light;

an absorption member arranged in a second outgoing direction, the absorption member absorbing the laser light; and the light receiving unit to receive return light of the laser light, the instructions comprising:

estimating, on a basis of the output signal generated at a time when the outgoing direction of the laser light is the first outgoing direction and the output signal generated at a time when the outgoing direction of the laser light is the second outgoing direction, a signal regarding the return light which is reflected by the absorption member, wherein, in the estimating, a noise estimation unit estimates a noise signal generated due to the first signal.

* * * * *